US008627184B2

(12) United States Patent
Hughes et al.

(10) Patent No.: US 8,627,184 B2
(45) Date of Patent: Jan. 7, 2014

(54) SYSTEMS AND METHODS FOR PROTECTING A MULTI-PART BROADCAST CONTROL MESSAGE

(75) Inventors: Patrick J. Hughes, Dana Point, CA (US); Panagiotis Thomas, Carlsbad, CA (US); Yong Jin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1093 days.

(21) Appl. No.: 12/415,930

(22) Filed: Mar. 31, 2009

(65) Prior Publication Data

US 2010/0251067 A1 Sep. 30, 2010

(51) Int. Cl.
*G06F 11/00* (2006.01)

(52) U.S. Cl.
USPC .......................... 714/776; 714/775; 714/746

(58) Field of Classification Search
USPC .................................................. 714/776, 752
See application file for complete search history.

(56) References Cited

U.S. PATENT DOCUMENTS

| 2006/0136728 | A1 | 6/2006 | Gentry et al. | |
| 2008/0016424 | A1* | 1/2008 | Chen | 714/752 |
| 2009/0015370 | A1* | 1/2009 | Rowse | 340/5.2 |

FOREIGN PATENT DOCUMENTS

| JP | H07131454 A | 5/1995 |
| JP | 2007503134 A | 2/2007 |
| JP | 2008523766 A | 7/2008 |

OTHER PUBLICATIONS

Amna Abdul Wahid, et al., "An Optimal Message Authentication Scheme for Lossy Channels", Jan. 1, 2006, Emerging Technologies, 2006. ICET '06. International Conference 0 N, IEEE, PI, pp. 443-448, XP031065404, ISBN: 978-1-4244-0502-2.
Atallah M, et al., "A Tree-Based Forward Digest Protocol to Verify Data Integrity in Distributed Media Streaming", Jul. 1, 2005, IEEE Transactions on Knowledge and Data Engineering, IEEE Service Center, Los Alamitos, CA, US, pp. 1010-1014, XP011132792, ISSN: 1041-4347.
International Search Report and Written Opinion—PCT/US2010/029346, International Search Authority—European Patent Office—Jan. 25, 2011.
Tieyan Li, et al., "Adaptive Stream Authentication for Wireless Multimedia Communications", Mar. 1, 2007, IEEE Wireless Communications and Networking Conference, 2007, WCNC 2007, Mar. 11-15, 2007, Hong Kong, IEEE Operations Center, Piscataway, NJ, pp. 2613-2618, XP031097624, ISBN: 978-1-4244-0658-6.
Pannetrat A. and Molva, R., "Efficient Multicast Packet Authentication"—Instut Eurecom, pp. 1-12, 2003.
Taiwan Search Report—TW099109970—TIPO—Feb. 4, 2013.

(Continued)

*Primary Examiner* — Sarai Butler
(74) *Attorney, Agent, or Firm* — Won Tae Kim

(57) ABSTRACT

A method and/or apparatus are provided for protecting control information during broadcasts in a system where primary and second mobile broadcast control messages (PMBCM and SMBCM) are utilized. In order to protect the SMBCM, a first hash information instance is computed based on hashes for each a plurality of control data blocks for the SMBCM. The first hash information instance is appended to the PMBCM. Error-correcting code words are generated for the plurality of hashes for the plurality of control data blocks for the SMBCM. These error-correcting code words are appended to the control data blocks of the SMBCM. A receiver uses the first hash instance information in the PMBCM to determine if any control data blocks of the SMBCM are corrupt. If so, the error-correcting code words may be used to reconstruct the corrupted hash(es) for the control data block(s) in order to authenticate the remaining control data blocks.

43 Claims, 18 Drawing Sheets

(56) References Cited

OTHER PUBLICATIONS

Tanaka, T., et al., "Study on Practical Message Authentication Mechanism for Digital Streaming Services", IEICE Technical Report (ISEC 2001 19-52): Japan, the Institute of Electronics, Information and Communication Engineers, Jul. 18, 2001, vol. 101, No. 214, pp. 15-22.

Zhou, Y., et al., "Multimedia Broadcast Authentication Based on Batch Signature [Advances in Mobile Multimedia]", IEEE Communications Magazine, Aug. 2007, vol. 45, Issue 8, pp. 72-77.

Shintani, Y., et al., "The proposal and evaluation of stream authentication using Merkle Hash Tree and IDA" IPSJ SIG Technical Reports, Japan: Information Processign Society of Japan, Jul. 14, 2006, vol. 106, No. 176. pp. 137-144.

Shintani, Y., et al., "Stream authentication system using Merkle Hash Tree and IDA", 68th Information Processing Society of Japan Conference (2006) Proceedings of National Conference (3) Japan, The Information Processing Society of Japan, Mar. 7, 2006, 4E-4. 3-329-3-330.

* cited by examiner

SYSTEMS AND METHODS FOR PROTECTING A MULTI-PART BROADCAST CONTROL MESSAGE

BACKGROUND

1. Field

Various features pertain to broadcast control channels. At least one aspect pertains to methods for protecting a multiple message broadcast control channel.

2. Background

In a wireless multicast or broadcast delivery system, content and control information are transmitted from a single network server to several recipients over a lossy transmission environment, i.e., a wireless multicast channel. The control information typically includes two types of messages, a single primary message and one or more secondary messages. The primary message contains information that is processed by every recipient. It contains global information about the transmission network and includes identification information about the secondary messages, i.e. secondary messages identifiers. Therefore, the primary message is typically processed by the recipients before any of the secondary messages can be processed.

Secondary message includes data blocks, that is, a number M data blocks, which contain information that only a subset of the N recipients actually process. For example, the secondary messages may be addressed to a subset of all the recipients while the data blocks may be targeted for one or more recipients within the subset. The secondary messages may also be processed by every recipient or by only some of the recipients. The data blocks may also be processed by all or only some of the recipients.

It is possible for the recipients to receive erroneous information from these messages. Noise from the transmission media may alter the contents of the primary and/or secondary messages. Also, interference, such as intentional interference by malicious parties attempting to interfere with the communications may alter the primary and/or secondary messages. In most communication systems, the underlying communication infrastructure applies error-correcting codes to a whole message that can correct many, but not all, transmission errors. However, the error-correcting codes are able to detect the uncorrectable errors. In this case, the data blocks with uncorrectable errors are treated as erasures, and the corresponding data is ignored by the recipients.

While corrupted, erroneous or tampered data blocks (e.g., containing video, audio, etc.) may cause some information to be presented incorrectly or incomplete, its malicious effects are relatively limited. However, if blocks containing control messages are modified or tampered in transit (e.g., by a malicious entity), these control messages can potentially change or modify the operation of the receiver device (e.g., change codes, channels, security levels, etc.) thereby compromising its operation and/or security. In such scenarios, it is the goal of an attacker to cause the recipients to process these modified control messages, thereby changing the receiver's state of operation to a malicious state. Consequently, a method is needed to efficiently protect a multi-part broadcast control messages during transmission and/or be able to ascertain whether a control message has or has not been modified.

SUMMARY

A method and/or apparatus are provided for protecting control information during broadcasts in a system where primary and second mobile broadcast control messages (PM-BCM and SMBCM) are utilized.

According to one feature, a method for generating a secondary broadcast control message is provided that may be implemented, for example, on a transmitter, encoder, processor, and/or may be stored in a computer-readable medium. A secondary broadcast control message is generated that includes a plurality of control data blocks and error correcting code words. Information for the secondary broadcast control message may be included in a primary broadcast control message. A first hash information instance may be computed for the secondary broadcast control message based on a plurality of hashes for the plurality of control data blocks of the secondary broadcast control message. The first hash information instance may be included in the primary broadcast control message. The primary broadcast control message and the secondary broadcast control message may then be transmitted or broadcasted.

In one example, computing the first hash information instance for the secondary broadcast control message based on a plurality of hashes for the plurality of control data blocks of the secondary broadcast control message may include (a) computing a first hash from a first control data block of the secondary broadcast control message, (b) computing a second hash from a second control data block of the secondary broadcast control message; and/or (c) computing the first hash information instance from the first hash and the second hash. A first error correcting code word may be computed based on the first hash and one or more additional hashes for the control data blocks of the secondary broadcast control message. A second error correcting code word may be computed based on the second hash and one or more additional hashes for the control data blocks of the secondary broadcast control message. The first error correcting code word and the second error correcting code word may be included in the secondary broadcast control message. The first error correcting code word may be included as part of the first control data block and the second error correcting code word may be included as pan of the second the control data block. In one example, the first error correcting code word may also be based at least partially on the second hash.

According to another feature, a method for processing a secondary broadcast control message is provided that may be implemented, for example, on a receiver, decoder, processor, and/or may be stored in a computer-readable medium. A primary broadcast control message may be obtained. A secondary broadcast control message associated with the primary broadcast control message may also be obtained. For instance, the primary broadcast control message and secondary broadcast control message may be wirelessly received as part of one or more broadcasts. A first hash information instance for the secondary broadcast control message in the primary broadcast control message may be identified. A second hash information instance may be computed based on a plurality of control data blocks of the secondary broadcast control message, where the secondary broadcast control message includes error correcting code words that facilitate computing a correct version of the second hash information even if one or more of the control data blocks have been compromised. In one example, each control data block may have an appended error correcting code word based on one or more computed hashes for the plurality of control data blocks. The first hash information instance may then be compared to the second hash information instance to determine whether the secondary broadcast control message has been compromised. A digital signature of the primary broadcast control message may also be verified, where the digital signature covers the primary broadcast control message and the first hash information instance.

A determination may then be made that a first control data block has been compromised. As a result, a first hash of the first control data block may be reconstructed from the error correcting code words. The second hash information may then be computed based on the first hash and one or more additional hashes for the plurality of control data blocks.

According to one aspect, a determination may be made that a first control data block of the secondary broadcast control message has been compromised based on an error correcting code calculation. As a result, a code word may be identified corresponding to a second control data block of the secondary broadcast control message. A first hash may then be computed for the first control data block of the secondary broadcast control message based at least in part on an error correcting code word corresponding to the second control data block of the secondary broadcast control message. A second hash may be computed from the second control data block of the secondary broadcast control message. The second hash information instance may then be computed from the first hash and the second hash. Computing the second hash information instance may include: (a) computing a first hash from a first control data block of the secondary broadcast control message; (b) computing a second hash from a second control data block of the secondary broadcast control message; and/or (c) computing the second hash information instance from the first hash and the second hash.

According to another aspect, if the comparison of the first hash information instance to the second hash information instance indicates that the secondary broadcast control message has been compromised additional steps may be performed. A third hash may be computed from a first code word corresponding to the first control data block. A fourth hash may be computed from a second code word corresponding to the second control data block. The second hash information instance may be recomputed from the third hash and the fourth hash. The first hash information instance may then be compared to the recomputed second hash information instance to determine whether the secondary broadcast control message has been compromised. The recomputed second hash information instance may then be compared to the first hash information instance to determine if they match. If a match is determined, (a) the one or more compromised control data blocks of the secondary broadcast control message may be identified and/or discarded, and/or (b) one or more of the remaining control data blocks may be utilized. If no match is determined, the secondary broadcast control message may be discarded.

According to yet another aspect, if the comparison of the first hash information instance to the second hash information instance indicates that the secondary broadcast control message has been compromised, additional steps may be performed. A first code word may be obtained corresponding to the first control data block and including information for a hash of the second control data block. A third hash may be computed for the second control data block based on information from the first code word. The second hash information may be recomputed instance from the first hash and the third hash. The recomputed second hash information instance may then be compared to the first hash information instance to determine if they match. If a match is determined, (a) the second control data block identified and/or discarded, and (b) one or more of the remaining control data blocks may be utilized. If no match is determined, (a) a second code word may be obtained that corresponds to the second control data block and includes information for a hash of the first control data block, (b) a fourth hash may be computed based on information from the second code word, and/or (c) the second hash information instance may be recomputed from the second hash and the fourth hash.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
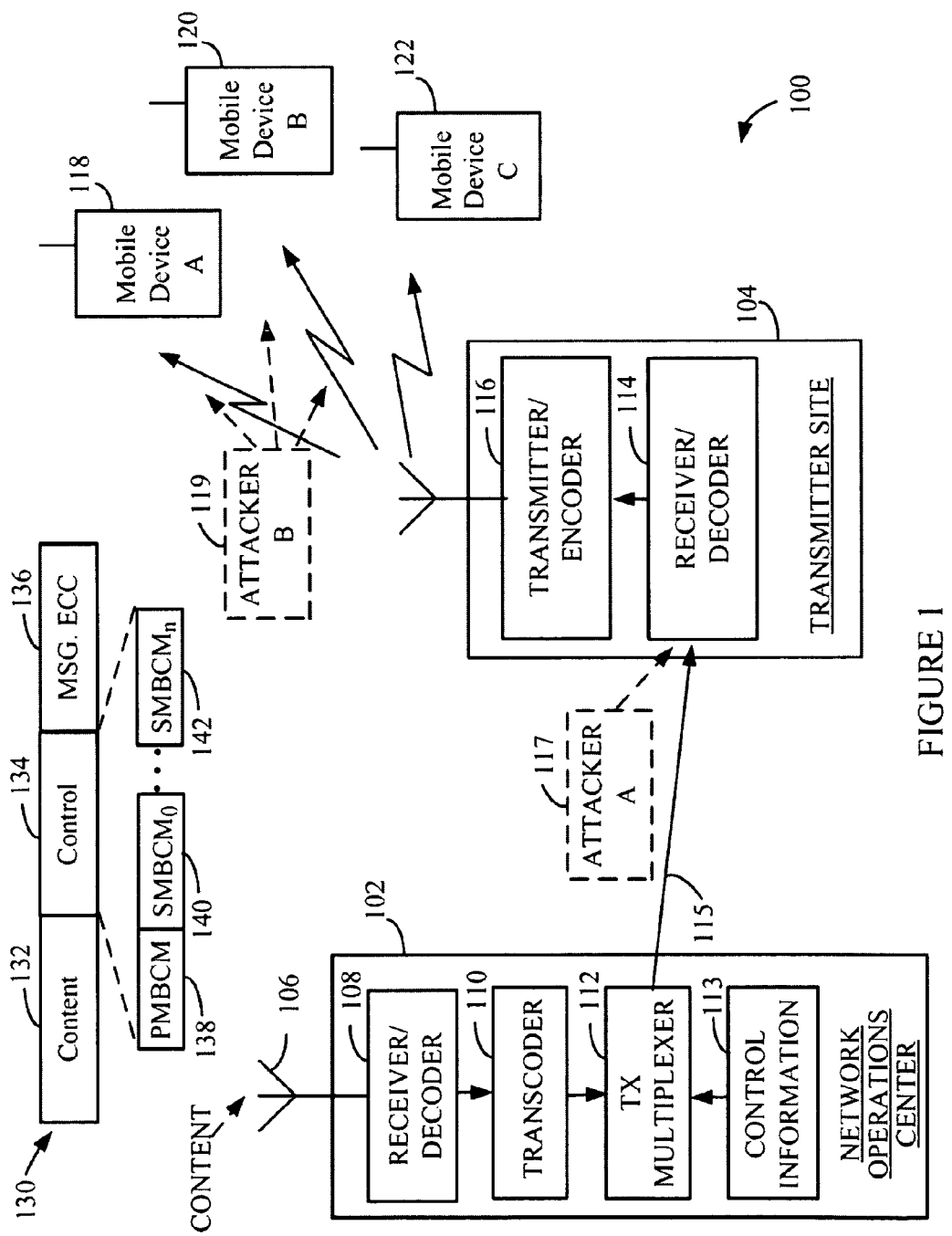
FIG. 1 is a block diagram showing an example mobile broadcast system in which a primary mobile broadcast control message (PMBCM) is protected by a digital signature.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Overview

In multicast or broadcast distribution systems, control information, such as service guides, end-user license agreements, etc., need to be distributed to recipients correctly. An attacker can modify this control information, having an undesirable effect to the overall system. Usually, this risk can be addressed by computing a cryptographic authentication code over all of the control information. However, transmission errors caused by the noisy nature of the transmission medium may cause failed authentication verification. The amount of transmission errors can be reduced with the use of error correcting codes, such as Reed-Solomon codes, but not eliminated. While a message (including data and control information) may be protected by an error correcting code over the whole message, this does not distinguish between errors to data versus errors to control messages. Note that when errors to data (e.g., video, audio, etc.) occur, such data may often be ignored or reconstructed without significant deleterious effects. However, when errors are present to control information (e.g., control messages that can modify the operation or a receiver), these errors may be more difficult to reconstruct and can affect the performance of a system if retransmissions are needed.

A scheme is provided herein which combines erasure codes, digital signatures, and cryptographic hashes to enable control information to be verified in the presence of transmission errors. By using erasure codes, hash values of lost blocks of a control message can be regenerated. The regenerated hash values are then used to verify the remaining information in a strong cryptographic manner.

In one example, a private/public cryptographic key pair is generated by a security server. The private key is securely stored at the server, while the public key is distributed to all recipients that are to receive a multicast transmission (e.g., including a primary and second message). In addition to the private/public key pair, the server and the recipients may also generate an erasure code generator matrix, such as a Reed-Solomon Erasure Code Generator Matrix R. When the server is creating a primary message and a secondary message (comprising a plurality of data blocks) for transmission or broadcasting to the recipients, it generates a hash hx for each data block within the secondary message. These hash values hx may be combined to form a hash vector H, which the transposed vector is $H^T=[h1\ h2\ \ldots\ hM]$ for $x=1\ \ldots\ M$. Using these hash values, a plurality of erasure codes C, which the transposed vector is $C^T=[c1\ c2\ \ldots\ cM]$ for $x=1\ \ldots\ M$, can be generated such that $C=RH$. Then, a hash of the hash vector H is computed and stored as part of the primary message by the server. This is done for each of the secondary messages. Then, the server computes the digital signature of the primary message using the private key and sends it with the primary message. Finally, the erasure codes C are appended to the corresponding data block in every secondary message, which is sent to the recipients. An erasure code transforms a message of n blocks into a message with more than n blocks, such that the original message can be recovered from a subset of those blocks. The fraction of the blocks required to reconstruct is called the rate, denoted r. Erasure codes are used as part of forward error correction.

In the primary message, all of the information, including the hash information, is secured by the digital signature. Upon receiving the primary message, the recipients verify its digital signature. If the signature verification fails (e.g., either by modification by an attacker or noise on the transmission channel), the primary message is discarded. If the signature verification is successful, the recipients process the primary message; this includes identification and hash information for the secondary messages. Then, the recipients acquire the secondary messages using the information from the primary message. If the secondary message is received without any transmission errors, then the hash of each data block is computed and combined to form a hash vector. Then, the hash of the hash vector is locally computed and compared to the received hash from the primary message. If the hash from the primary message matches the computed hash, then the secondary message is received correctly and can be processed. If the hash from the primary message does not match the computed hash, then the secondary message is assumed to have been modified and is discarded. If the secondary message is received with transmission errors that corrupted K data blocks (where K<M/2), then the hash of each of the M-K error-free data blocks is computed. Then, K erasure code words are taken from any of the M-K data blocks. The K erasure code words are combined with the M-K computed hash values and input into an erasure code decoder, which regenerates the missing K hash values. The regenerated K hashes are combined with the computed M-K hashes to form a local version of the hash vector. Then, the hash of the locally-computed hash vector is computed and compared to the received hash from the primary message. If the received hash from the primary message matches the locally-computed hash, then the M-K data blocks from the secondary message are received correctly and can be processed. If the received hash from the primary message does not match the locally-computed hash, then the secondary message is assumed to have been modified and is discarded.

Example Network Environment

FIG. 1 is a block diagram showing an example mobile broadcast system 100 in which a primary mobile broadcast control message (PMBCM) is protected by a digital signature. A secondary mobile broadcast control message (SMBCM) is also protected by the digital signature because hash information of the SMBCM is protected by the digital signature in the PMBCM.

In one example, broadcast message transmissions 130 may include content 132 (e.g., video, data, etc.), control information 134), and a message error correcting code (ECC) 136 over the whole message 130. The control information 130 may include a PMBCM 138 and one or more SMBCMs 140 and 142 associated with the PMBCM 138.

A network operations center 102 collects broadcast signals and prepares them for broadcast over a mobile broadcast network. For example, the mobile broadcast network may be a Media Forward Link Only (MediaFLO) network, which is standardized by the FLO Forum. Other example broadcast networks are Digital Video Broadcasting-Handheld (DVB-H), published as European Telecommunications Standards Institute (ETSI) standard EN 302 304, Digital Multimedia Broadcasting (DMB) in Korea, and Integrated Services Digital Broadcasting (ISDB), by the Association of Radio Industries and Businesses in Japan. The systems and methods described herein are not limited to the above example mobile broadcast systems, but could be applied to other broadcast systems as well.

The network operations center 102 may receive content (e.g., video and/or data) and process it for distribution to a transmitter site 104. Content may be received by satellite signal at an antenna 106. Alternatively, content may be received from the internet or other network (not shown). A receiver/decoder 108 demodulates and decodes the received content. A transcoder 110 (e.g., transmission coder) codes the content for mobile broadcasting. A transmit multiplexer 112 may multiplex the content (e.g., video and/or data) with control information to generate a multiplexed stream of control information 113 for transmission. The network operations center 102 then transmits the multiplexed stream 115 to the transmitter site 104.

The transmitter site 104 may include a receiver/decoder 114 which receives and decodes the multiplexed broadcast signals from the network operations center 102. Signals may be transmitted to the transmitter site 104 by satellite, or by other high speed data transmission network, such as, for example, a fiber optic network (not shown). The transmitter/encoder 116 encodes and transmits mobile broadcast signals to one or more mobile wireless devices 118, 120 and 122. Prior to transmission, the transmitter/encoder 116 may generate an error correcting code for the whole transmission, which can be used by a recipient to determine if the transmission is corrupt and potentially regenerate the corrupted portions.

In one example, content and control information may be transmitted (e.g., as part of message 130) from a network server, e.g., network operations center 102 to N recipients (shown as wireless devices 118, 120 and 122) over a lossy transmission environment, i.e., a wireless multicast channel. Control information 134 may include at least two types of messages: a PMBCM and one or more SMBCMs.

Note that, unless the multiplexed stream 115 (e.g., content and/or control information) is protected, there is a risk that an attacker A 117 may intercept the stream 115 and replace the control information therein with its own control information, and retransmit it to the transmitter site 104 (thereby attempting to modify the operation of recipient wireless devices). An attacker B 119 may also intercept messages broadcasted from the transmitter site 104 in order to replace control information therein.

The error correcting code 136 generated by the transmitter/encoder 116 may be used to detect transmission errors by the recipient devices 118, 120 and 122. However, an attacker 110 may intercept the transmission 130, insert or replace control messages in the transmission, generate its own error correcting code, and retransmit the message such that no error is detected by the devices 118, 120 and 122. Consequently, this conventional use of error correcting codes over the whole transmission or message 130 is inadequate to protect against attackers that replace control information.

According to one feature, an additional level of error correcting codes are used to specifically protect control information against corruption or replacement during transmission.
Related Message Protection Approaches Various approaches may be used to protect a primary message and/or secondary message from attackers.

A first approach provides a digital signature over the primary message and a separate digital signature over the secondary message, using a private key at the server. The recipients use a public key to verify the digital signatures. In this approach, an error in any of the M data blocks of the secondary message causes all of the M data blocks to be discarded, since there is no way to determine which of the M data blocks has the error or was attacked.

A second approach computes a keyed-hash over each secondary message using a shared secret key between the server and the network devices. In addition to the shortcomings of the first approach, this approach also has a problem with non-repudiation since there is no way to determine the actual sender of the secondary messages. Non-repudiation means being certain of who sent the message, so that a sender cannot claim not to be the sender of a message, or repudiate the message.

A third approach computes a digital signature over the primary message and a digital signature over each of the M data blocks in a secondary message. While this third approach addresses the issues associated with the first and second approaches, the size of the digital signature may be prohibitively large in relation to the size of the data block. Moreover, the processing requirement to verify the M digital signatures for each block is also burdensome on the recipients.

A fourth approach generates a hash tree over the second message and stores the root hash in the primary message. A digital signature is computed over the primary message. This approach addresses the processing issue with the third approach. However, each data block must contain enough hash information to guarantee that each data block can be verified independently of the others. For small numbers of data blocks M, the amount of additional hash information is manageable but can quickly grow as the data blocks M increases.

Example Method for Protecting Multi-Part Control Message

Figure 2:
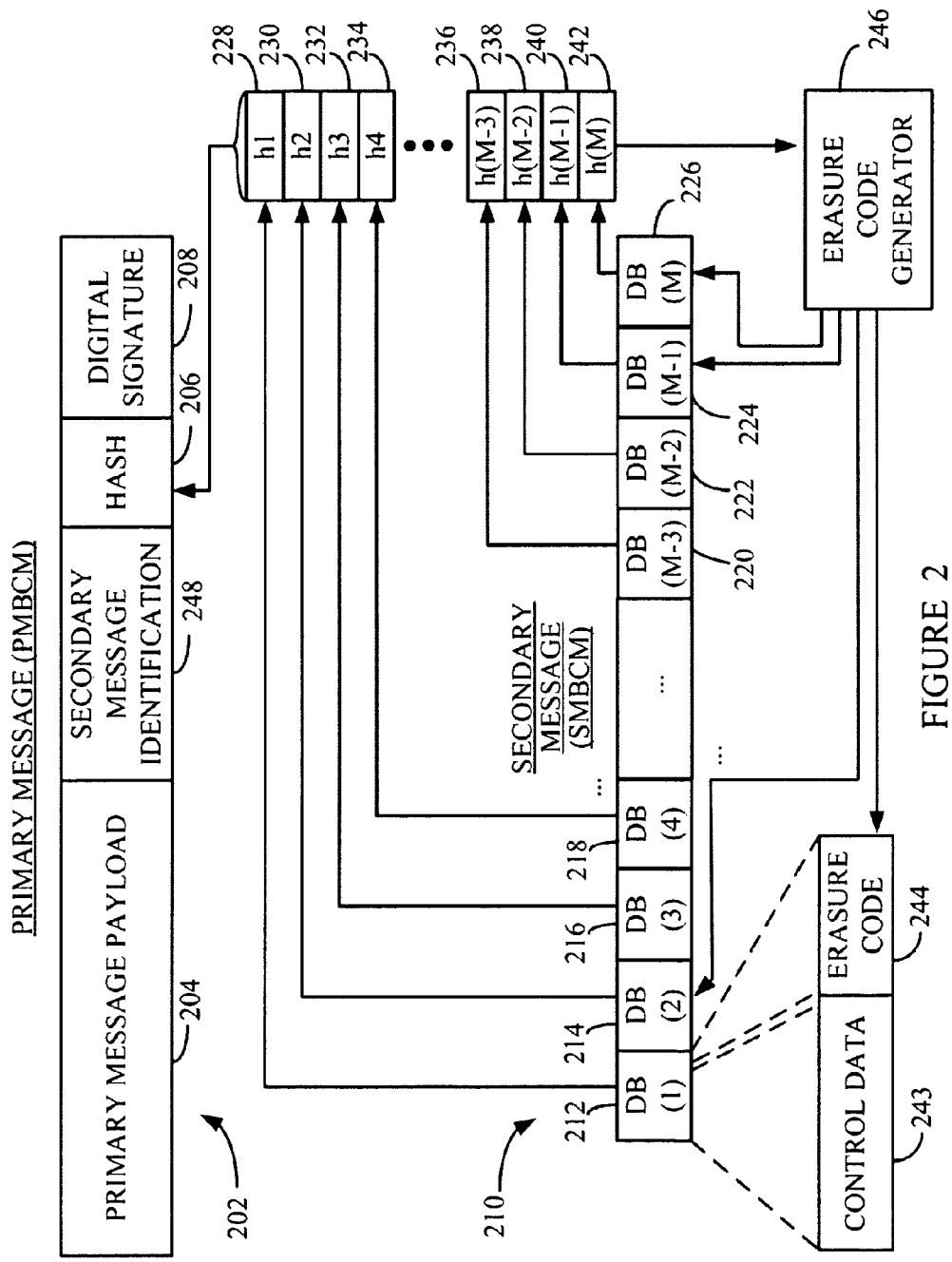
FIG. 2 is a block diagram of a system for efficiently protecting a mobile broadcast control message (MBCM) that is divided between a PMBCM (PMBCM) and a SMBCM.

FIG. 2 is a block diagram of a system for efficiently protecting a mobile broadcast control message (MBCM) that is divided between a PMBCM and a SMBCM. In one example, this process may be implemented at a transmitter of a MBCM. As used herein, an MBCM may be part of a larger broadcast or transmission (such as 130 in FIG. 1) that is protected by a high level ECC 136 (FIG. 1). A PMBCM 202 may include a primary message payload 204, hash information 206 of at least a part of a SMBCM and a digital signature 208. The primary message payload 204 may include global information about the transmission network, and identification information 248 about at least one SMBCM 210, i.e. secondary messages identifiers. The PMBCM 202 is typically processed by the recipients before any of the secondary messages are processed. The SMBCM 210 may include one or more control data blocks.

It may be more important for the control data blocks to be protected than typical data carrying data blocks. Data carrying blocks may be video data which, if corrupted or received with errors, would only temporarily or minimally affect a user's experience (e.g., temporary degradation of a video display, or temporary loss of signal). However, the video signal typically returns to normal after a short time. However, control data blocks may affect the operation of the receiving device (e.g., which channels are viewed in a mobile video system, security codes, content restrictions or control. If the control data blocks are received in error, the functioning of the mobile video device may be impaired. For example, the wrong channels may be displayed, or no channels at all. Accordingly, it may be more important to protect the control data blocks.

One example of the SMBCM 210 is shown. Each SMBCM 210 includes M control data blocks 212, 214, 216, 218, 220, 222, 224 and 226, which contain information that only a subset of the N recipients may actually process. For example, the SMBCMs may be addressed to a subset of all the recipients while the control data blocks may be targeted for one or more recipients within the subset. A secondary message identification 248 may include information identifying which SMBCMs are needed by or targeted to which receivers. For example, the secondary message identification 248 may include a mapping of a service or channel to an SMBCM ID. In that case, receivers would identify the service or channel selected and read the mapping from the selected service or channel to the mapped SMBCM ID. Accordingly, the receiver would know which SMBCMs to read.

Figure 3:
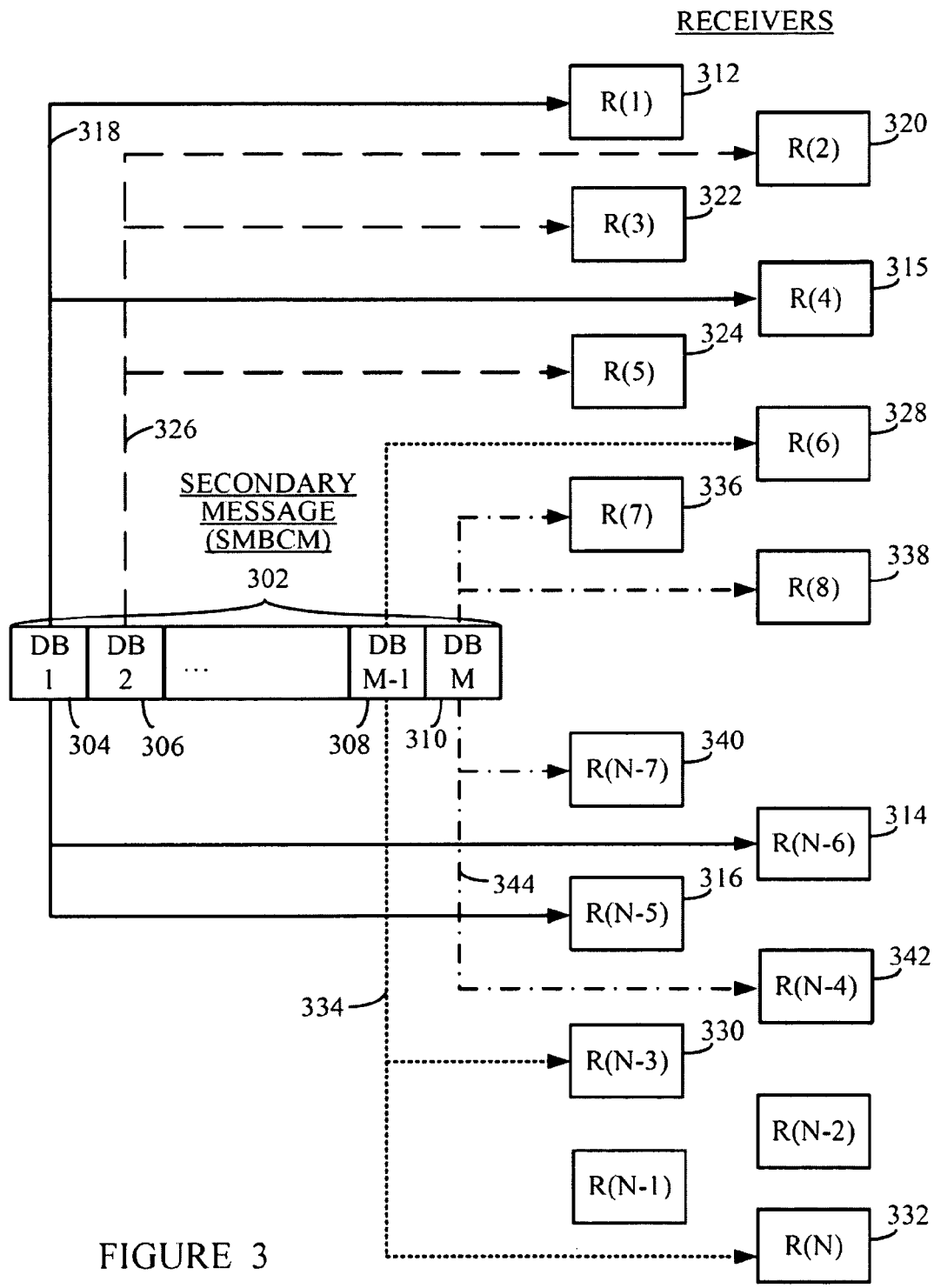
FIG. 3 is a block diagram illustrating certain data blocks of a secondary being dedicated for specific mobile wireless receivers.

For example, FIG. 3 is a block diagram illustrating certain control data blocks of a secondary message being dedicated for specific mobile wireless receivers. The SMBCM 302 may include a plurality of control data blocks, control data block 1 (DB1) 304, control data block 2 (DB2) 306 to control data block M-1 (DB M-1) 308 and control data block M (DB M) 310. In the example of FIG. 3, there are N receivers (R). The control data block DB 1 304 is intended for, and will be processed by, Receiver 1 (R1) 312, Receiver 4 (R4) 315, Receiver N-6 (R(N-6)) 314 and Receiver R(N-5) (R(N-5)) 316, as indicated by solid line 318. Similarly, control data block DB 2 306 is intended for receivers R(2) 320, R(3) 322 and R(5) 324, as shown by large dashed line 326. Similarly, control data block DB M-1 308 is intended for receivers R(6) 328, R(N-3) 330 and R(N) 332, as shown by small dashed line 334. Finally, control data block DB M 310 is intended for receivers R(7) 336, R(8) 338, R(N-7) 340, and R(N-4) 342 as shown by dot-dashed line 344.

Referring again to FIG. 2, a private/public cryptographic key pair may be generated by the network (e.g., network operations center 102). The private key is securely stored at the network, while the public key is distributed to all of the recipients (e.g., receivers) that will receive the multicast transmission. Additionally, the network and the recipients may also generate an erasure code generator matrix, such as, for example, a Reed-Solomon erasure code generator matrix R. The systems and methods herein are described with respect to private/public key cryptography and Reed-Solomon erasure codes, as examples. Other cryptography and erasure codes could be used.

The network 102 (e.g., network operations center) or transmitter site 104 may generate a hash (h(1) 228, h(2) 230, h(3) 232, h(4) 234, h(M-3) 236, h(M-2) 238, h(M-1) 240 and h(M) 242) for each data block (212, 214, 216, 218, 220, 222, 224 and 226) within the SMBCM 210. For instance, hash h1 228 is generated based on a data portion 243 of the control data block DB1 212. These hash values, h1, h2 . . . h(M) are combined to form a vector H (e.g., h1 . . . h(M)), such that the transposed vector H is represented as:

$$H^T = [h1\ h2\ \ldots\ hM]$$

An erasure code generator 246 may generate erasure codes (e.g., vector C) from the hash values (e.g., vector H) and code generator matrix R by performing the following matrix computation:

$$C = R \times H,$$

such that the transposed vector C is represented as:

$$C^T = [c1\ c2\ \ldots\ cM].$$

Therefore, each erasure code word produced by the generator 246 is a combination of hashes for a plurality of control data blocks. The erasure code words in the transposed vector C are appended to the corresponding control data block in every SMBCM. One example element of the transposed vector C is shown for control data block DB1 212 where erasure code word 244 is appended to the control data portion 243 of the control data block DB1 212. In this example, the erasure code word 244 is based on a plurality of the hashes (h1 . . . h(M)) associated with a plurality of control data blocks. Similarly, the other elements of the erasure code words in C corresponding to each control data block DB are appended to each control data block DB. Note that each erasure code associated with a particular control data block may be based on one or more hashes for other data blocks. Therefore, if one of those other control data blocks is corrupted (at a receiver), its hash can be reconstructed based on the erasure code associated with other control data blocks.

In addition to the hashes of each control data block, a hash information 206 is also computed of the hash vector (e.g., the combination of hashes for all blocks). In other words, hash information 206 is a hash of hashes. The hash 206 of the hash vector is computed and stored in the PMBCM by the server 102 or transmitter 104. By computing a hash information 206 of hashes of the control data blocks, each of the control data blocks can be protected without including a separate hash for each control data block in the SMBCM. One hash 206 (which is a hash of hashes) can be used as a hash for all of the control data blocks. This is done for each of the SMBCMs. The server or transmitter computes the digital signature 208 of the PMBCM using the private key and sends it with the PMBCM.

In the PMBCM, all of the information, including the hash information 206, is secured by the digital signature 208. Upon receiving the PMBCM, the recipients verify its digital signature 208. If the signature verification fails (either by modification by an attacker or noise on the transmission channel), the PMBCM is discarded.

Figure 4:
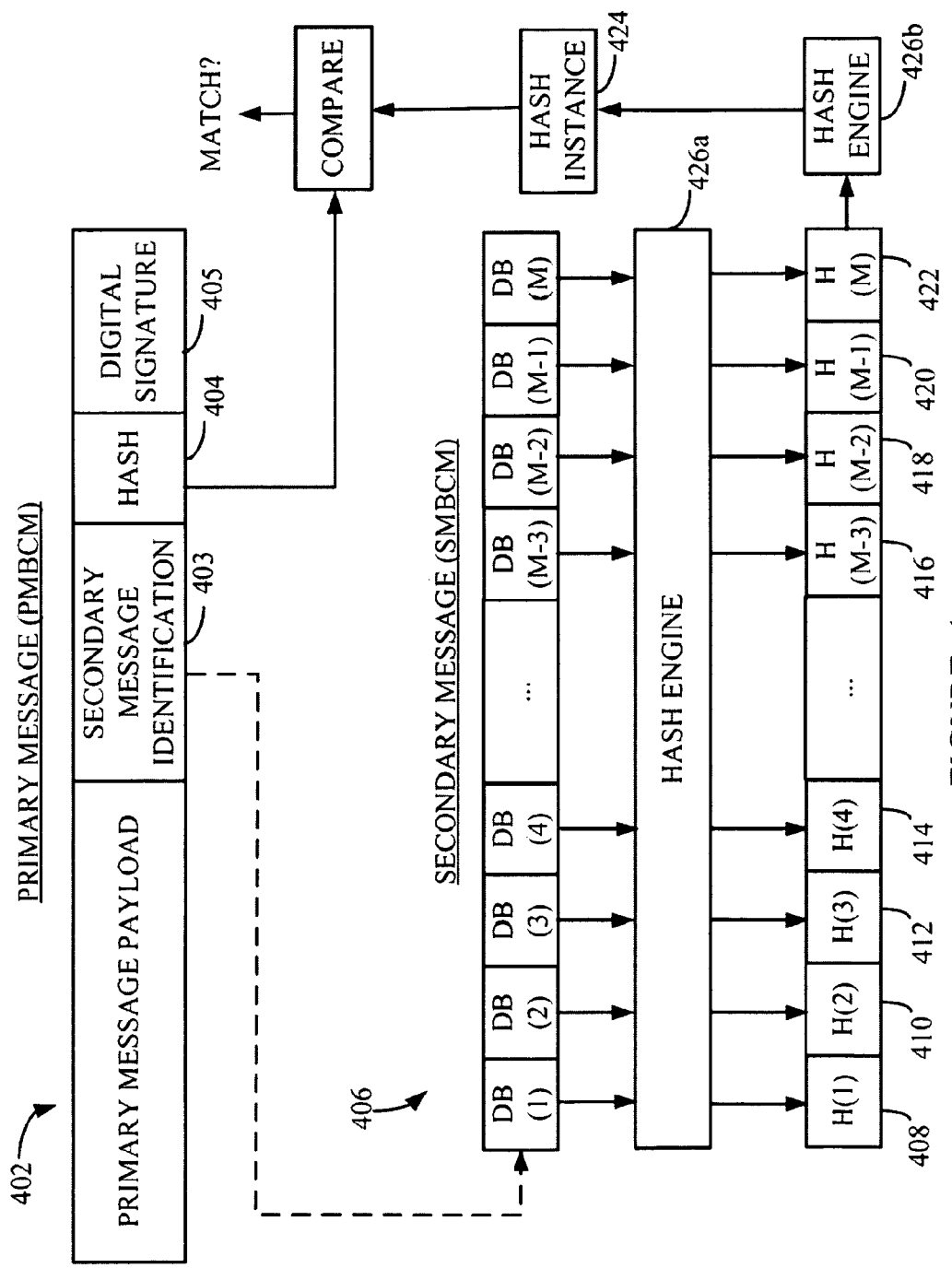
FIG. 4 is a block diagram illustrating a reception of an efficiently protected broadcast control message.

FIG. 4 is a block diagram illustrating reception of an efficiently protected broadcast control message. This diagram illustrates how a receiver may perform operations to verify the accuracy of information in a broadcast control message (e.g., primary and/or secondary messages). For instance, a digital signature 405 over the whole primary message 402 may be used to verify the message's accuracy. Note that the digital signature 405 may be a signature, at least in part, of hash information 404, because hash information 404 may be included in the primary message 402. Hash information 404 is a hash of hashes of SMBCM control data blocks, as described further below. If the signature verification succeeds, the recipients process the PMBCM 402. The PMBCM 402 includes a secondary message identification 403 and hash information 404 for one ore more SMBCMs. The recipients acquire an SMBCM 406 using the information 403 from the PMBCM 402. If the SMBCM is received without any transmission errors, then each hash (408, 410, 412, 414, 416, 418, 420 and 422) of each control data block is computed by hash engine 426 and combined to form a hash vector such that the transposed hash vector is $H^T = [h1\ h2\ \ldots\ h(M)]$. A hash engine 426 is shown as hash engines 426a and 426b. The hash engines 426a and 426b may be the same hash engine, and are only shown separately to illustrate the different aspects of the hash engine 426.

A hash instance 424 of the hash vector is computed by the hash engine 426b. In other words, hash instance 424 is a hash of hashes of the received SMBCM control data blocks. Hash instance 424 is compared to the received hash 404 from the PMBCM 402 (e.g., another hash instance). If the hash instance 404 from the PMBCM 402 matches the computed hash instance 424, then the SMBCM 406 is assumed to have been received correctly and can be processed. If the hash 404 from the PMBCM 402 does not match the computed hash 424, then the SMBCM 406 is assumed to have been modified and may be discarded.

Figure 5:
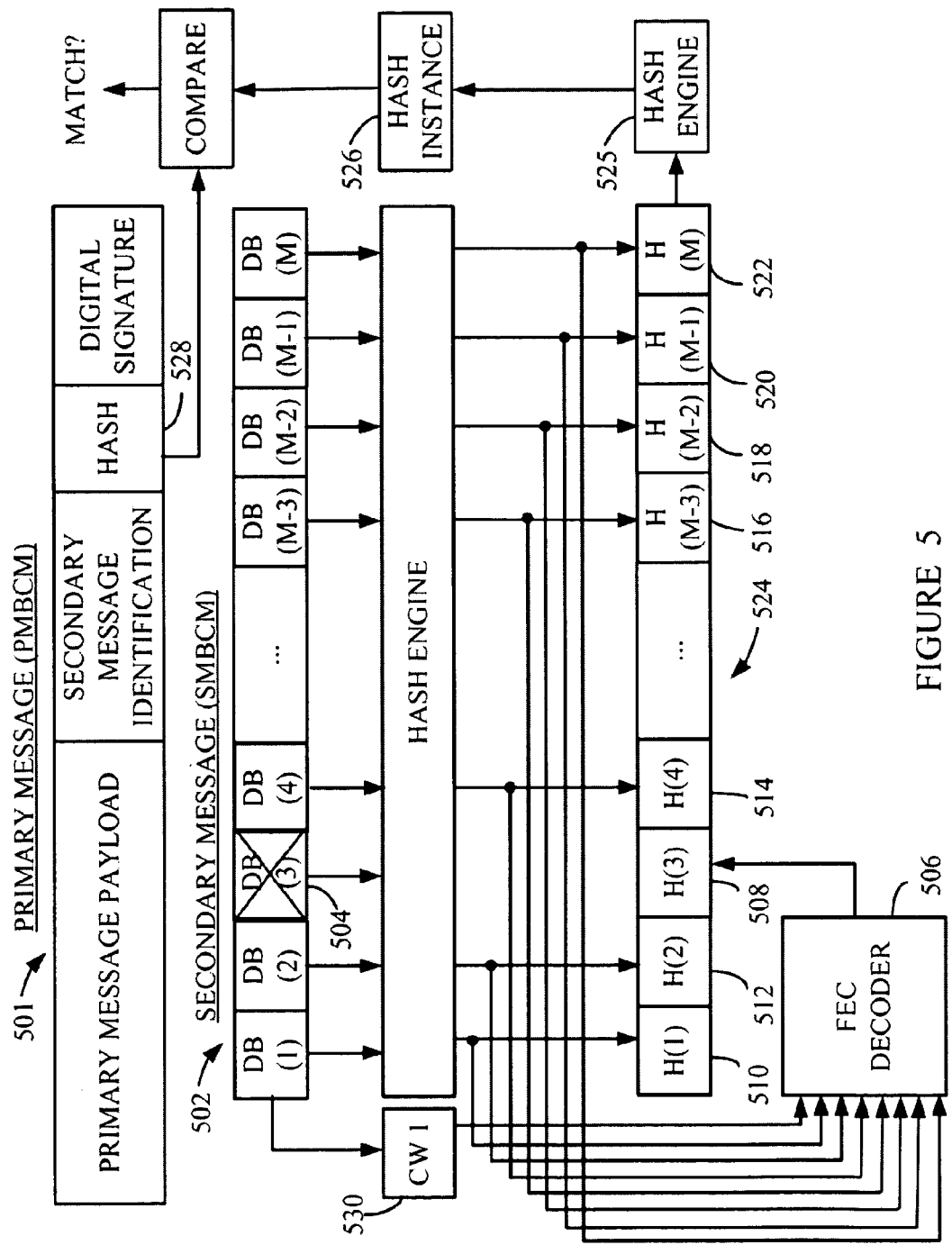
FIG. 5 is a block diagram illustrating a reception of an efficiently protected broadcast control message in which at least one data block was received incorrectly.

FIG. 5 is a block diagram illustrating reception of an efficiently protected broadcast control message in which at least one control data block was received incorrectly. A PMBCM 501 is received at a receiver. The PMBCM 501 may be processed as illustrated in FIG. 4. If the SMBCM 502 is received with errors, erasure code words from the control data blocks received correctly may be used to compute the correct hash for the data block received with error(s). If there are K corrupted control data blocks (i.e., blocks received with errors), then there are M-K error-free control data blocks. For example, control data block DB3 504 may be received corrupted, as shown in FIG. 5 by the "X" on control data block DB3 504. The K erasure code words may be taken from any of the M-K control data blocks correctly received. In the example of FIG. 5, K=1. The K erasure code words are combined with the M-K computed hash values and input into the erasure code decoder 506. In the example, one erasure code word CW 1 530 serves as input to a forward error correction (FEC) decoder 506 because one control data block (i.e., DB3 504) was received corrupted. Hash values 510, 512, 514, 516, 518, 520, 522 for the control data blocks are used together with the code word CW 1 530 to generate the missing hash value for the corrupted control data block DB 3 504. The FEC 506 may utilized the code words (e.g., erasure code words) to regenerate the missing K hash values, for example, one hash value, Hash 3 508 corresponding to the corrupted control data block DB3 504. The regenerated K hashes 508 are combined with the computed M-K hashes 510, 512, 514, 516, 518, 520, 522 to form a hash vector 524. The hash of the hash vector 524 is computed by a hash engine 525 as a hash instance 526 and compared to the received hash instance 528 from the PMBCM 501. If the hash 528 from the PMBCM matches the computed hash 526, then the M-K control data blocks from the SMBCM 502 are assumed to have been received correctly and can be processed. If the hash 528 from the PMBCM 501 does not match the computed hash 526, then the SMBCM 502 is assumed to have been modified and is discarded. Consequently, any modification to a transmission that results in an invalid change to the control information (e.g., SMBC blocks) can be detected.

Figure 14:
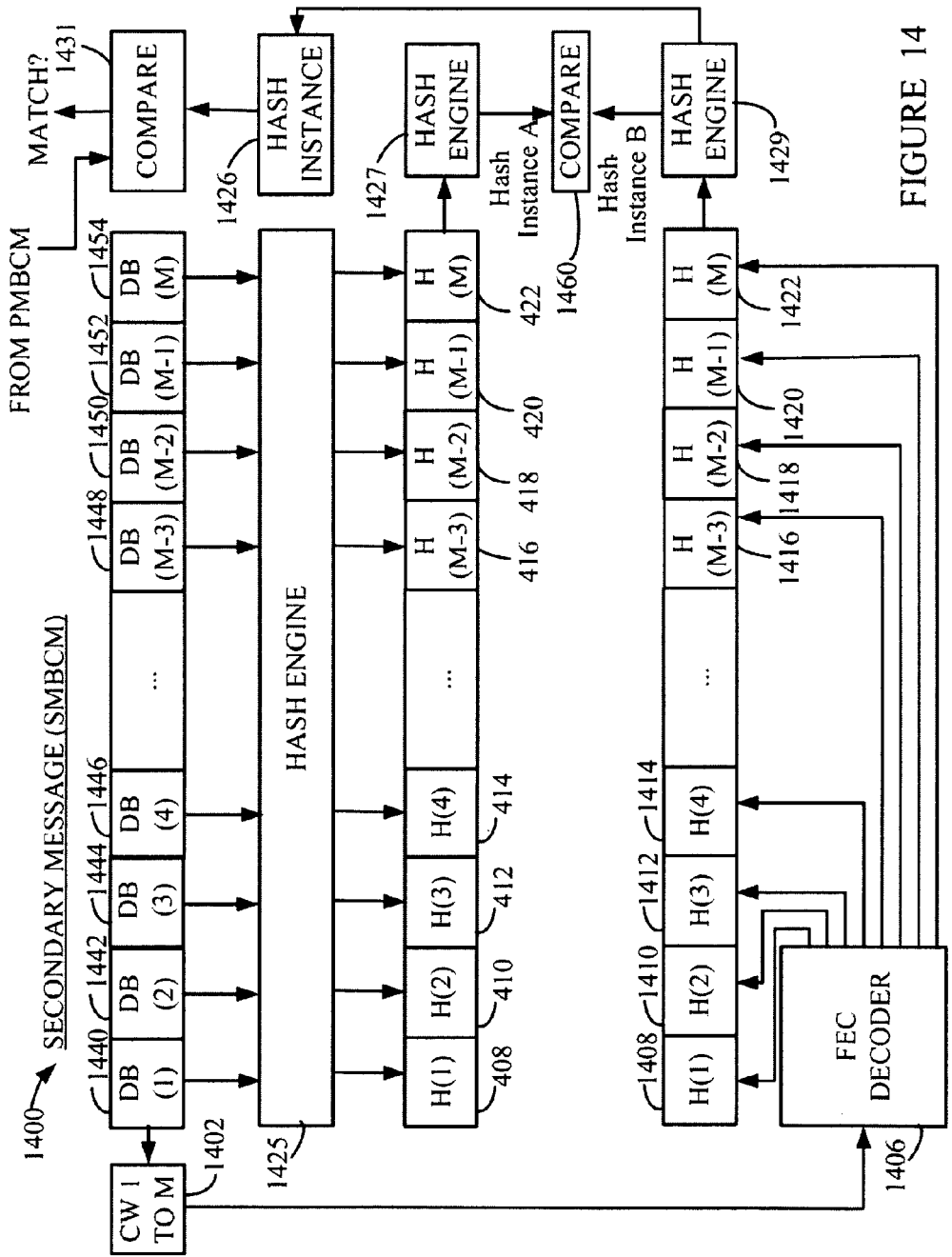
FIG. 14 is a block diagram illustrating a receiver capable of assuring that error correcting code words have been received correctly in cases where there are no unrecoverable data blocks.
Figure 16:
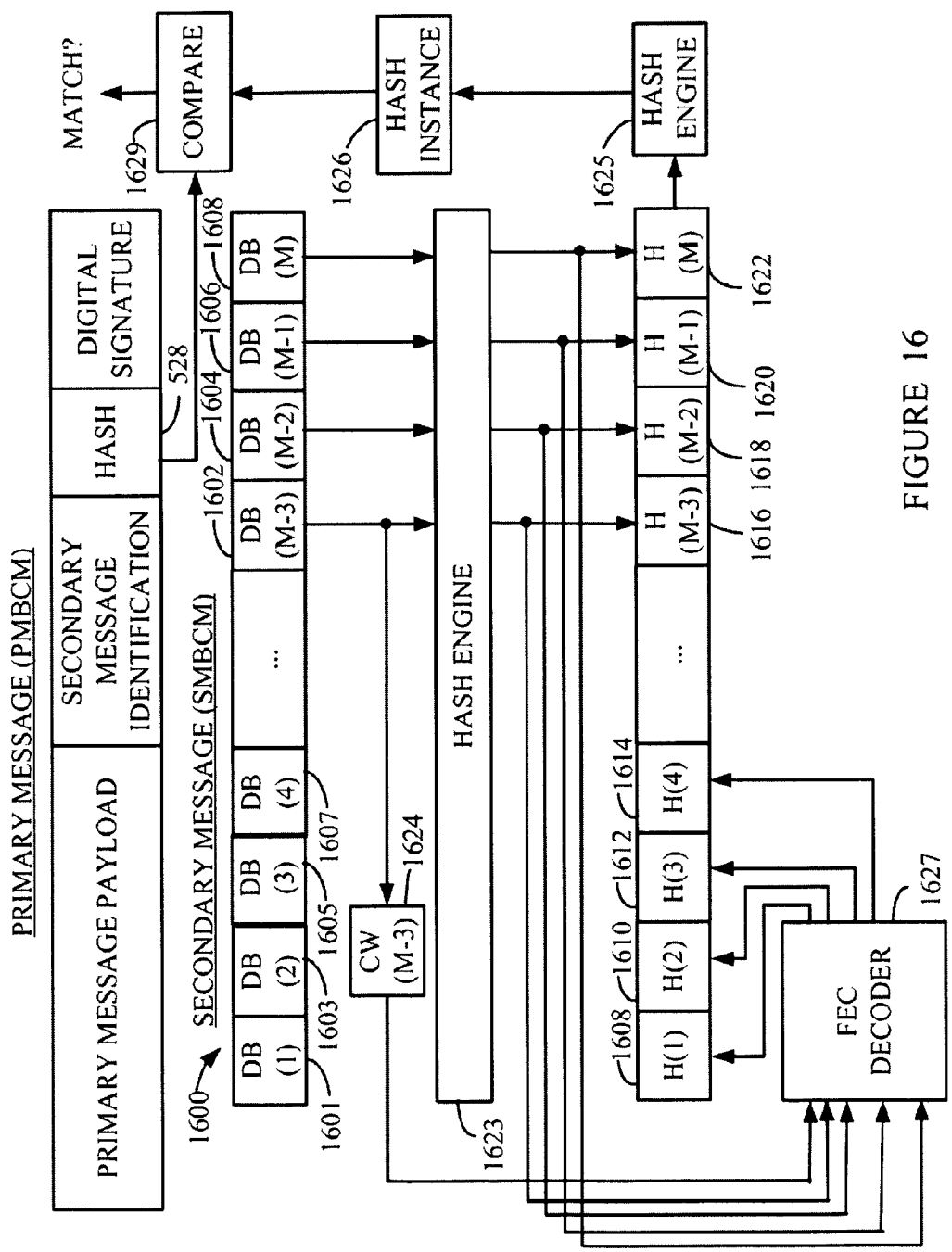
FIG. 16 is a block diagram illustrating a receiver capable of verifying a received secondary broadcast control message by using error correcting code words.

Note that alternative methodologies to those illustrated in FIGS. 4 and 5 may be possible. For instance, FIGS. 14 and 16 illustrate two alternative examples for protecting broadcast control messages.

Example Transmitter/Encoder Device and Operation thereof

Figure 6:
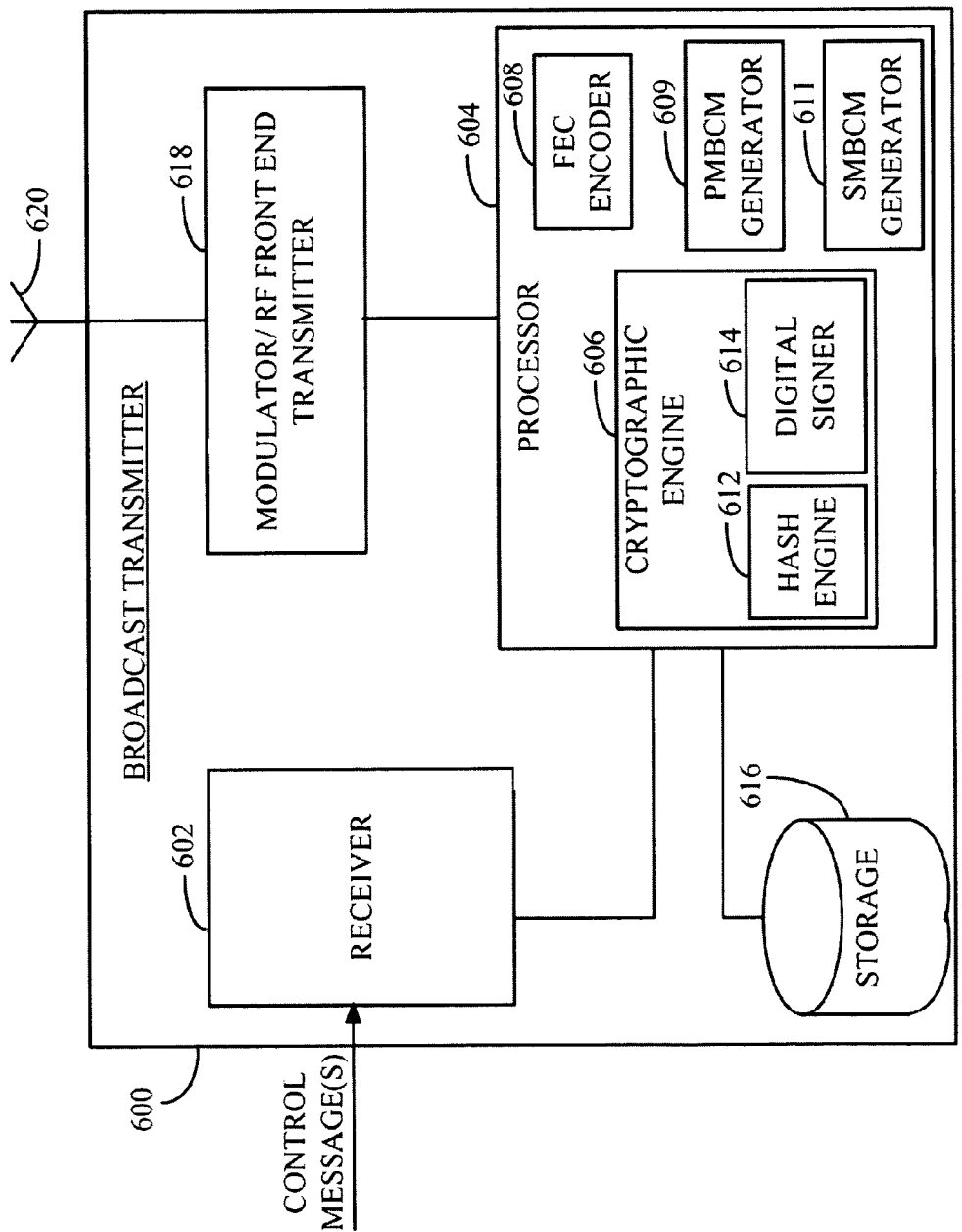
FIG. 6 is a block diagram illustrating an example of a broadcast transmitter 600 capable of efficiently protecting a multi-part broadcast control message.

FIG. 6 is a block diagram illustrating an example of a broadcast transmitter 600 capable of efficiently protecting a multi-part broadcast control message. The broadcast transmitter 600 may be, for example, the transmitter site 104 shown with respect to FIG. 1. The transmitter 600 may include a receiver 602 for receiving signals prepared for wireless broadcasting to mobile receivers. The receiver 602 may be, for example, the receiver 114 shown with respect to FIG. 1. For example, the receiver 602 may receive signals (e.g., control messages) from the network operations center 102 shown with respect to FIG. 1. The receiver 602 may be connected to a processor 604. The processor 604 may be included, at least in part, in the transmitter/encoder 116 shown with respect to FIG. 1. The processor 604 may include a primary broadcast control message generator 609, a secondary broadcast control message generator 611, cryptographic engine 606 and a FEC encoder 608. The cryptographic engine 606 may include a hash engine 612 for hashing a control message, such as the control data blocks 212-226 of the SMBCM 210 shown with respect to FIGS. 2-5. A digital signer 614 may create a digital signature, such as the digital signature 208 shown with respect to FIG. 2. The FEC encoder 608 may be adapted to generate an erasure code (e.g., error correcting code words) for the control message, such as erasure code 244 for control data block 212 and the other erasure code words appended to each of the control data blocks shown with respect to FIG. 2. Alternatively, various features or functions of the processor 604 may be included in the transcoder 110, multiplexer 112 or other module shown with respect to FIG. 1. In other words, various modules or functions of the processor 604 may be in the network operations center 102 or may be in the transmitter site 104 of FIG. 1. For example, digital signer 614 may be at the network operations center 102 while the FEC encoder 608 may be in the transmitter/encoder 116 at the transmitter site 104.

A modulator/RF front end 618 may be connected to the processor 604. The modulator/transmitter 618 modulates and/or transmits the primary and secondary control messages, along with other signals, such as digital video data and transmits the signals on antenna 620. A storage device 616 may also be connected to the processor 604 for storing the control messages and/or data.

One or more components of the broadcast transmitter 600 may be adapted to protect a multi-part broadcast control message. For instance, the primary broadcast control message generator 609 may be adapted to generate a primary broadcast control message while the second broadcast control message 611 may be adapted to generate a second broadcast control message. A hash may be computed over the secondary message SMBCM and appended to the primary message PMBCM. In one example, the hash over the SMBCM may be based on a plurality hashes for control data blocks of the SMBCM. Error correcting codes for the plurality of hashes may be generated and included as part of the SMBCM so that the control data blocks can be verified even if one or more of the control data blocks is corrupted during transmission. A digital signature may be computed over the PMBCM. This approach addresses the processing issue with the third approach noted above. However, each control data block of an SMBCM must contain enough hash information to guarantee that each control data block can be verified independently of the others. For small numbers of M control data blocks, the amount of additional hash information is manageable but can quickly grow as M increases.

Figure 7:
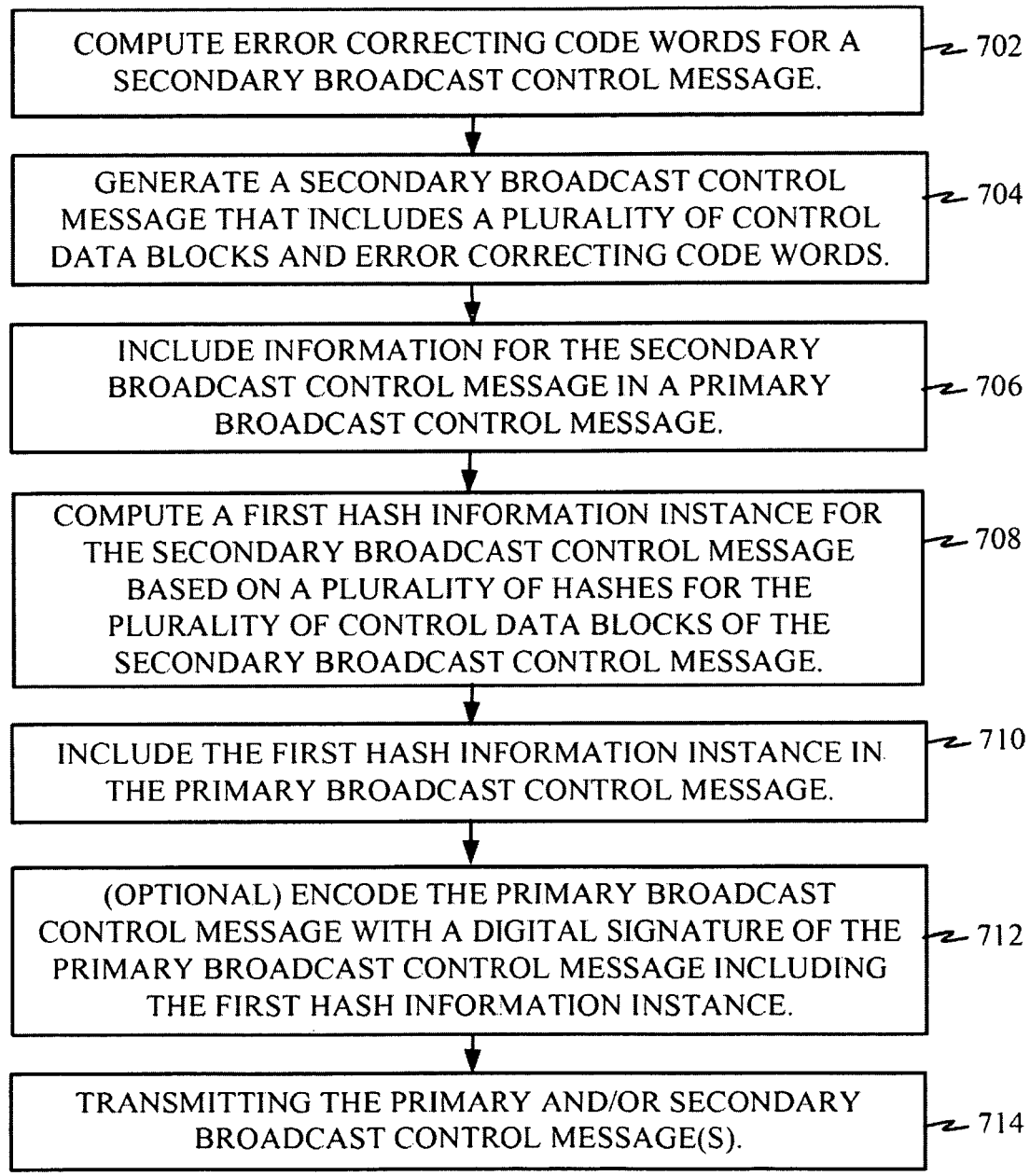
FIG. 7 is a flow diagram illustrating a method operational on a transmitter or encoder device for encoding a secondary broadcast control message.

FIG. 7 is a flow diagram illustrating a method operational on a transmitter or encoder device for generating a secondary broadcast control message. The method may be performed by transmitter/encoder 116 or Tx Multiplexer 112 shown with respect to FIG. 1. Error correcting codes may be computed for a secondary broadcast control message 702. For instance, an error correcting code for the secondary broadcast control message may be computed based on or more hashes for control data blocks of the secondary broadcast control message. The secondary broadcast control message may be generated that includes a plurality of control data blocks and error correcting code words 704. The computed error correcting code words may be appended to the control data blocks of the secondary broadcast control message. FIG. 2 illustrates one example of how a secondary broadcast control message 210 including control data blocks 212-226 having error correcting code words 244.

Information for the secondary broadcast control message may be included in a primary broadcast control message 706. For example, information identifying the secondary control message may be included in the primary broadcast control message. A first hash information instance for the secondary broadcast control message may be computed based on a plurality of hashes of control data blocks of the secondary broadcast control message 708. The first hash information instance may be included in the primary broadcast control message 710. Optionally, the primary broadcast control message may be encoded with a digital signature of the primary broadcast control message including the first hash information instance 712. The primary and/or secondary broadcast control message(s) may then be transmitted 714.

Figure 8:
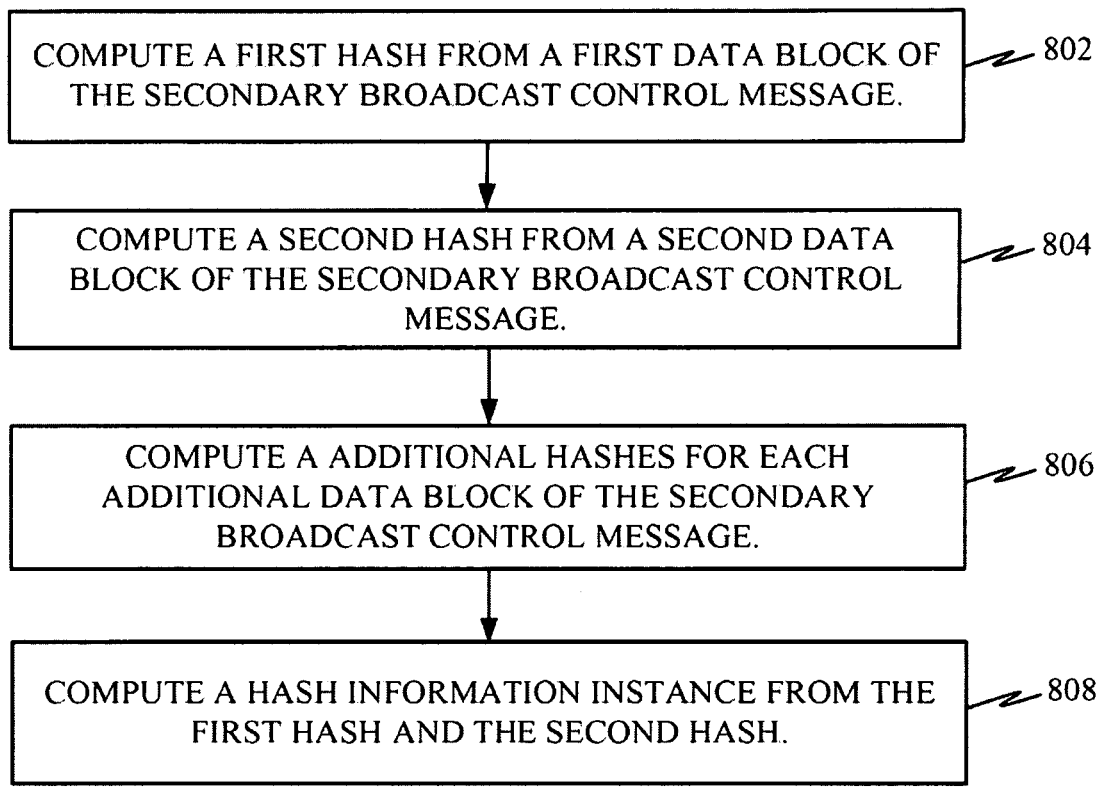
FIG. 8 is a flow diagram illustrating a method operational on a transmitter or encoder device that may be performed in conjunction with the method illustrated in FIG. 7.

FIG. 8 is a flow diagram illustrating a method operational on a transmitter or encoder device that may be performed in conjunction with the method illustrated in FIG. 7. The method of FIG. 8 provides an example of the step 708 (FIG. 7) of computing the first hash information instance for the secondary broadcast control message. A first hash is computed from a first control data block of the secondary broadcast control message 802. A second hash may be computed from a second control data block of the secondary broadcast control message 804. Similarly, additional hashes may be computed for each additional control data block of the secondary broadcast control message 806. A hash information instance is computed from the first hash and the second hash (and possibly the additional hashes of the additional control data blocks) 808. This hash information instance may be the first hash information instance of step 708 of FIG. 7 and/or the hash 206 of FIG. 2. This process may be repeated for each secondary message such that a hash information instance for each secondary message is included in the primary message.

Figure 9:
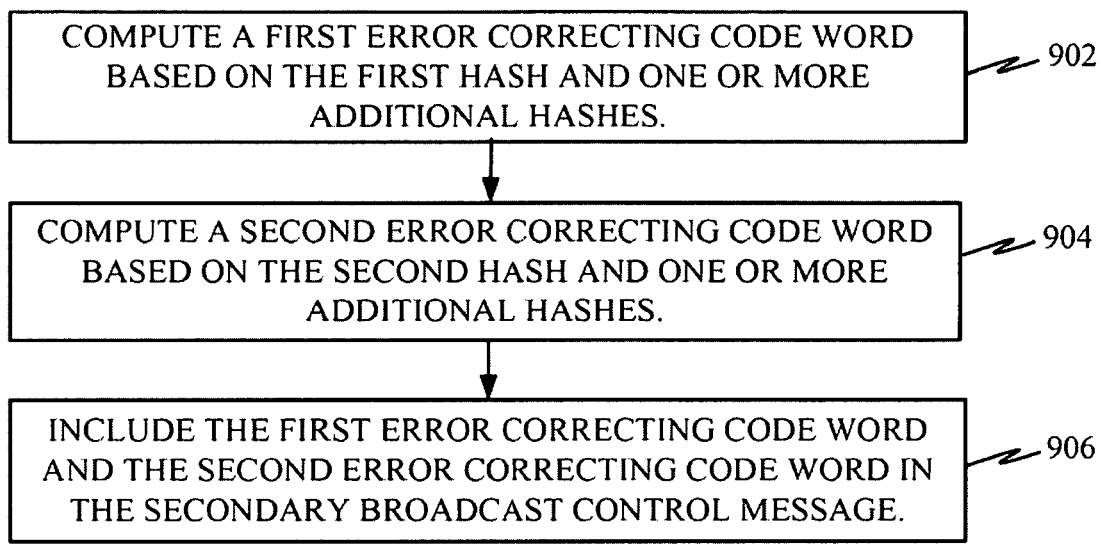
FIG. 9 is a flow diagram illustrating a method that may be used in conjunction with the method described with respect to FIGS. 7 and 8.

FIG. 9 is a flow diagram illustrating a method that may be used in conjunction with the method described with respect to FIGS. 7 and 8. For instance, the steps of FIG. 9 may be performed as part of steps 702 and/or 704 of FIG. 7. A first error correcting code word is computed based on a first hash and (possibly) one or more additional hashes 902. Such first hash may be a hash of a first control data block of the secondary broadcast control message while the one or more additional hashes may be hashes for other control data blocks of the secondary broadcast control message. Similarly, a second error correcting code word may be computed based on a second hash and (possibly) one or more additional hashes 904. Such second hash may be a hash of a second control data block of the secondary broadcast control message while the one or more additional hashes may be hashes for other control data blocks of the secondary broadcast control message. The first error correcting code word and the second error correcting code word may be included in the secondary broadcast control message 906. For example, the first error correcting code word may be appended to the first control data block and the second error correcting code word may be appended to the second control data block.

As illustrated in FIGS. 2, 7, 8, and 9, the integrity of a secondary broadcast control message may be secured by generating a hash from the hashes of control data blocks of the secondary broadcast control message. This hash is appended to an associated primary broadcast control message. Additionally, error correcting code words may be generated for each of the hashes of the control data blocks, thereby facilitating reconstruction of hashes for a potentially compromised control data block.

According to one feature for securing the integrity of a secondary message (or control data block therein), the digital signature is not distributed across each SMBCM but is localized to the PMBCM. For instance, the digital signature 208 in FIG. 2 is only for the PMBCM 202 and is not appended with the SMBCM 210. This saves significant processing time and power, and also consumes less communication bandwidth.

According to another feature for securing the integrity of a secondary message (or control data block therein), a single-level erasure code is generated where only the error correcting code words of the hash array are appended to the SMBCMs. For instance, as illustrated in FIG. 2, an erasure code 244 is generated based on the hash array (hashes 228-242) and is appended to the control data portion 243 of the first control data block DB1 212. This approach avoids the use of a second level of erasure codes (e.g., based on the digital signature 208 and/or hashes 228-242) thereby reducing processing power and time in addition to avoiding usage of more bandwidth consumption.

Example Receiver/Decoder Device and Operation thereof

Figure 10:
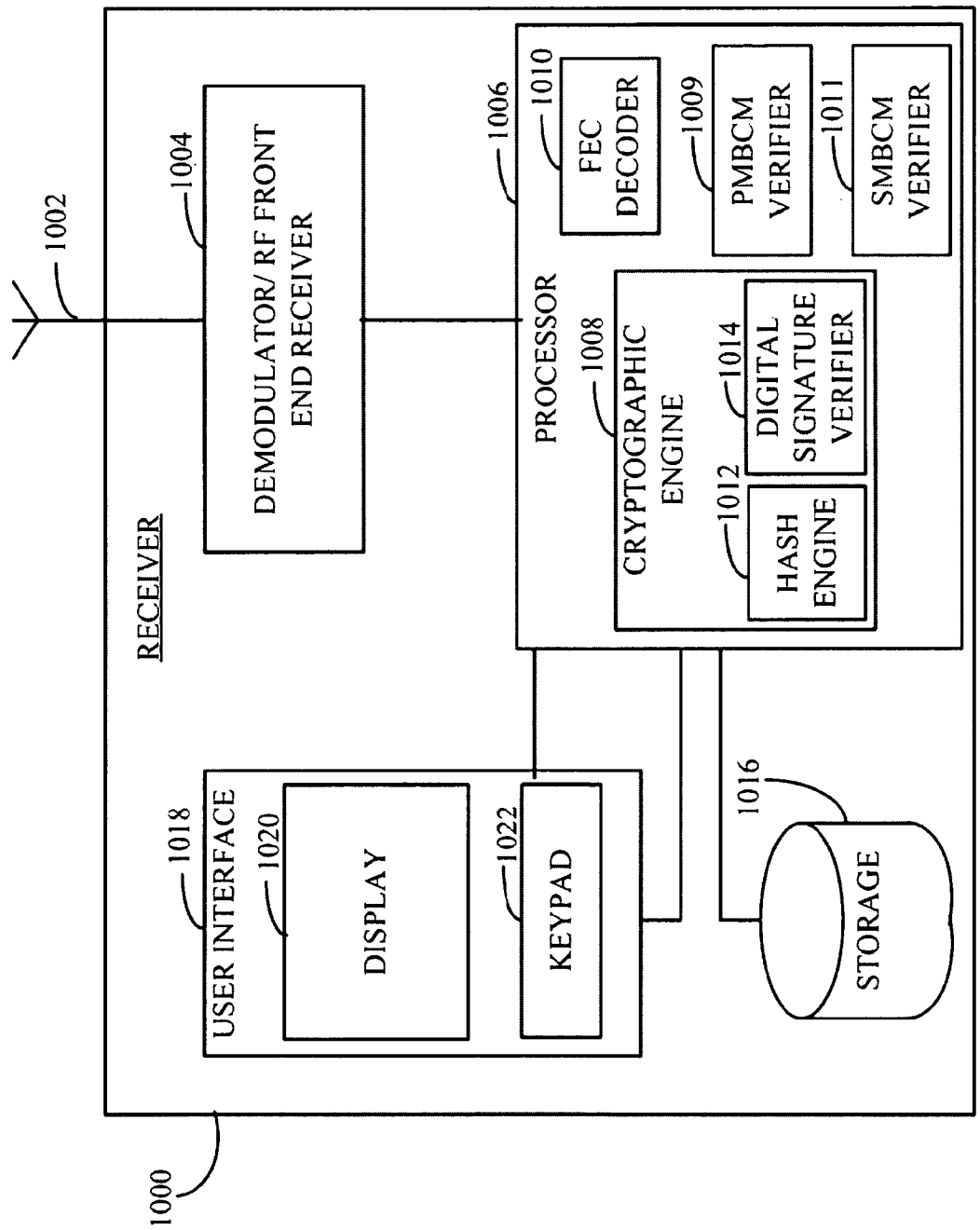
FIG. 10 is a block diagram of a receiver or decoder device capable of receiving and processing an efficiently protected multi-part broadcast control message.

FIG. 10 is a block diagram of a receiver or decoder device capable of receiving and processing an efficiently protected multi-part broadcast control message. The receiver 1000 may receive a primary message (PMBCM) and a secondary message (SMBCM) at antenna 1002. A demodulator/RF Front End Receiver 1004 receives and/or demodulates the received signals, including the PMBCM and SMBCMs. The demodulated messages are received by processor 1006. A processor 1006 may include a primary broadcast control message verifier 1009, a secondary broadcast control message verifier 1011, a cryptographic engine 1008 and a FEC decoder 1010. The cryptographic engine 1008 may be adapted to perform hashing of control data blocks at a hash engine 1012 and digital signature verification at a digital signature verifier 1014 as described above with respect to FIGS. 1-5. The hash engine 1012 may be separate from the cryptographic engine 1008. Also, if convenient, the cryptographic engine 1008 and FEC decoder 1010 may be on separate processors, instead of on a single processor 1006.

As described above with respect to FIGS. 4 and 5, a PMBCM may be decoded and the digital signature is verified. If the digital signature is incorrect, the PMBCM is discarded. If the digital signature is correct, the PMBCM is interpreted. The SMBCM ID is identified, and the SMBCM is acquired and decoded. The SMBCM hashes are computed by the hash engine 1012, as described with respect to FIGS. 4, 5, 14 and 15. If a control data block is received corrupted, then the processor 1006 passes K code words and M-K hashes to FEC decoder 1010. The FEC decoder 1010 may generate the missing hashes K, such as, for example, the hash h3 508 shown with respect to FIG. 5. A hash instance 526 of the hashes for control data blocks of a SMBCM is computed by the hash engine 1012. The processor 1006 compares hash instance 526 to a received hash instance 528. Processor 1006 is connected to storage 1016 for storing messages and data for use with receiver 1000.

The receiver 1000 may be capable of displaying mobile video signals. For example, the receiver 1000 may be a MediaFLO-compatible device or other mobile video device. Accordingly, the receiver 1000 may include a user interface 1018. The user interface 1018 may include a visual display 1020 and speaker (not shown) for playing video/audio received. The user interface 1018 may also include a keypad 1022 for receiving user input such as video channel selection, entering security information, such as a personal identification number (PIN), or other input information. The receiver 1000 may also include various other devices and modules not shown. For example, receiver 1000 may include a wireless wide area network transceiver for communicating on a wireless network, such as, for example, a CDMA cellular network or a GSM network.

Figure 11:
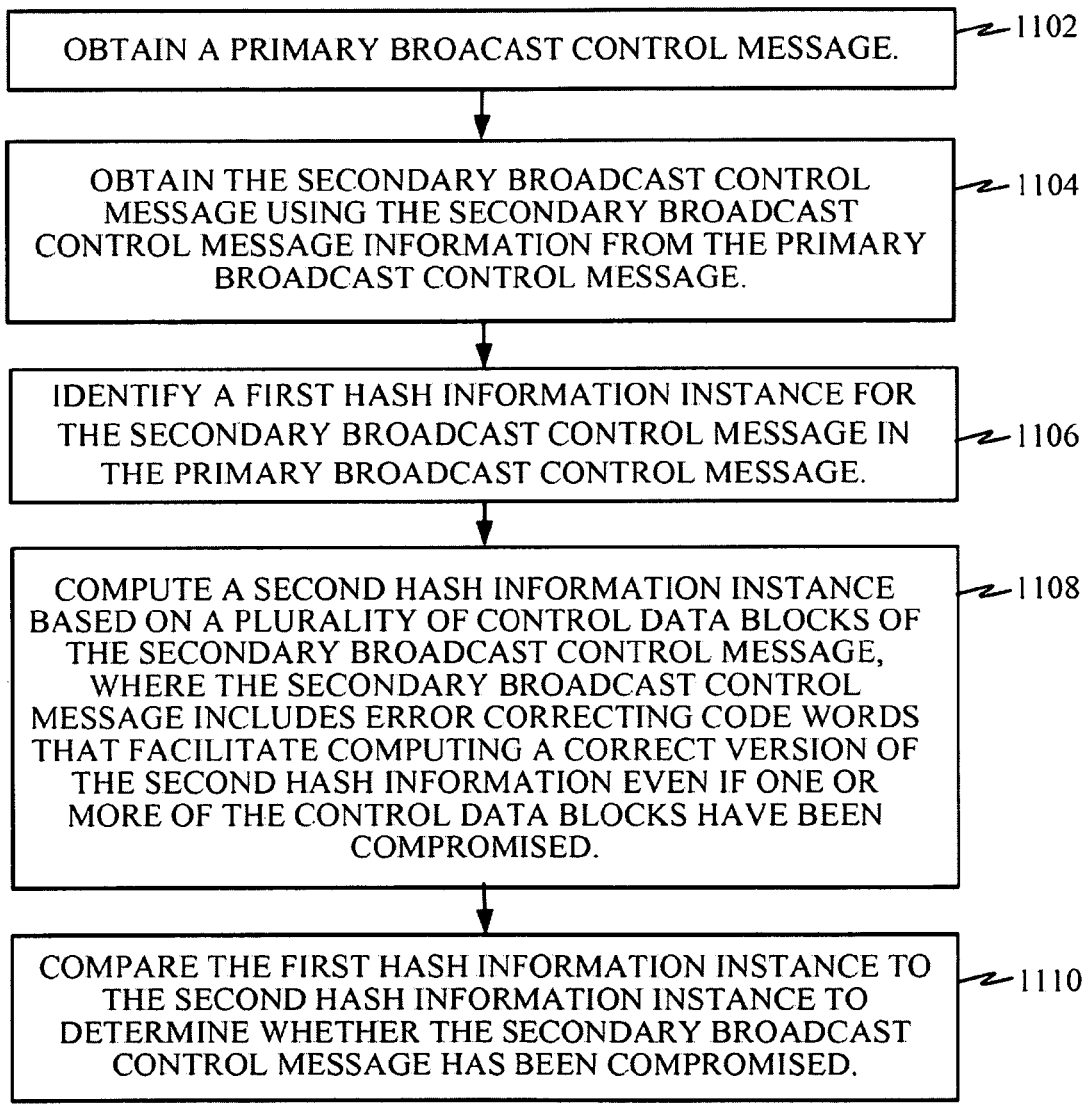
FIG. 11 is a flow diagram illustrating a method operational at a receiver or decoder device for receiving a secondary broadcast control message.

FIG. 11 is a flow diagram illustrating a method operational at a receiver or decoder device for receiving a secondary broadcast control message. For example, the method may be performed by the receiver 1000 of FIG. 10. A primary broadcast control message is obtained 1102. That is, the primary broadcast control message may be received (e.g., by listening on a particular channel) or may be read from a memory or buffer at the receiver. A digital signature of the primary broadcast control message may be verified. For example, the digital signature may be verified by a digital signature verifier 1014 (FIG. 10). A secondary broadcast control message may be obtained using the secondary broadcast control message information from the primary broadcast control message 1104. In some instances, secondary broadcast control message information for the secondary broadcast control message may be identified in, or obtained from, the primary broadcast control message. A first hash information instance for the secondary broadcast control message is identified in the primary broadcast control message 1106. The secondary broadcast control message may then be decoded. A second hash information instance (for the secondary broadcast control message) may be computed based on a plurality of control data blocks of the secondary broadcast control message, where the secondary broadcast control message includes error correcting code words that facilitate computing a correct version of the second hash information even if one or more of the control data blocks have been compromised 1108. The first hash information instance is compared to the second hash information instance to determine whether the secondary broadcast control message has been compromised 1110.

Figure 12:
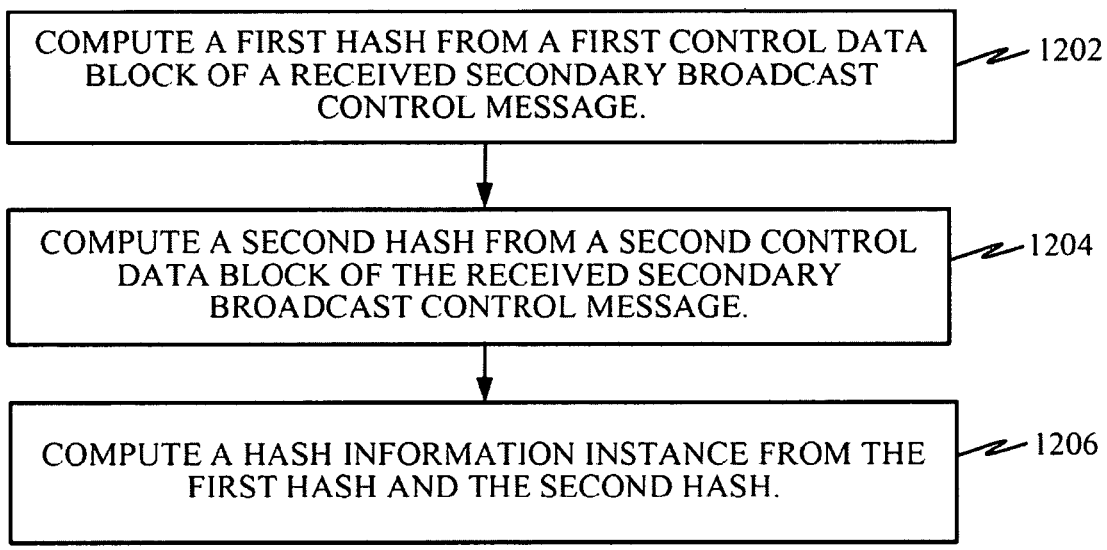
FIG. 12 is a flow diagram illustrating a method that can be carried out in conjunction with the method illustrated with respect to FIG. 11.

FIG. 12 is a flow diagram illustrating a method that can be carried out in conjunction with the method illustrated with respect to FIG. 11. The method of FIG. 12 may illustrate one example of the step 1108 (FIG. 11) for computing the second hash information instance for the secondary broadcast control message. A first hash from a first control data block of a received secondary broadcast control message is computed 1202. A second hash from a second control data block of the received secondary broadcast control message is also computed 1204. Finally, a hash information instance is computed from the first hash and the second hash 1206.

Figure 13:
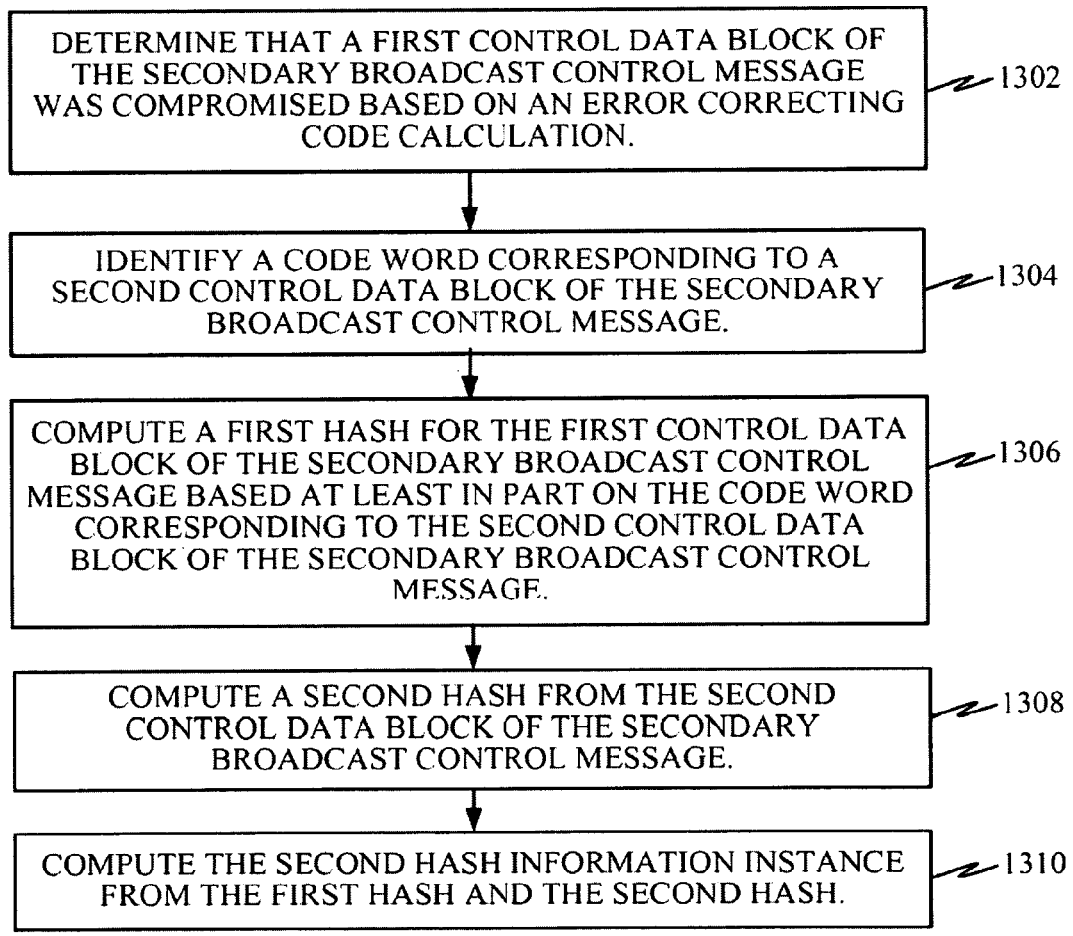
FIG. 13 is a flow diagram illustrating a method that may be carried out in conjunction with the method illustrated with respect to FIG. 11.

FIG. 13 is a flow diagram illustrating a method that may be carried out in conjunction with the method illustrated with respect to FIG. 11. For instance, the method of FIG. 13 may be performed if a corrupted secondary message (or control data block therein) is detected by higher level error correction coding (e.g. using message error correcting code 136 of FIG. 1). Based on error correction coding it may be determined that a first control data block of the secondary broadcast control message was compromised 1302. The determination may be made, for example, by FEC decoder 1010, shown with respect to FIG. 10. The compromised control data block may be, for example, DB(3) 504, shown with respect to FIG. 5. The receiver may then reconstruct a first hash of the first control data block from the error correcting code words. For instance, an error correcting code word corresponding to a second control data block of the secondary broadcast control message is identified 1304. The code word may be CW 1 530, shown with respect to FIG. 5. As described above with respect to FIG. 5, code word CW 1 530 may be erasure code 244. Specifically, the identified error correcting code word corresponds to a control data block that was received uncompromised. A first hash for the first control data block of the secondary broadcast control message is computed based at least in part on the code word corresponding to the second block of the secondary broadcast control message 1306. A second hash is computed from the second control data block of the secondary broadcast control message 1308. The hashes may be computed by the hash engine 1012 shown with respect to FIG. 10. The second hash information instance is computed 1310 from the first hash and the second hash. The hash information instance may be computed by the hash engine 1012 shown with respect to FIG. 10).

First Alternative Example of Protecting Broadcast Control Message

FIG. 14 is a block diagram illustrating a receiver capable of verifying a received secondary broadcast control message by using error correcting code words. This may be an alternative way of protecting and decoding a broadcast control message, and may be a variation of the methodology illustrated in FIGS. 4 and 5. In this example, a secondary broadcast control message 1400 may include a plurality of control data blocks 1440, 1442, 1444, 1446, 1448, 1450, 1452 and 1454. The plurality of control data blocks 1440, 1442, 1444, 1446, 1448, 1450, 1452 and 1454 may have a corresponding set of code words CW 1 to M 1402. Using the fact that C=RH, the equation $H=R^{-1}C$ can be formed.

At the transmitter/encoder, a hash instance is generated from hashes for each control data block of the SMBCM 1400. That hash instance may be appended to the associated PMBCM. Additionally, for each hash of a control data block, an error correcting code word may be generated and appended or associated with its corresponding control data block. These error correcting code words are shown as CW 1 to M 1402 corresponding to the control data blocks for the SMBCM 1400. The error correcting code words may be transmitted as part of the SMBCM 1400.

At the receiver/decoder, the integrity of the received SMBCM may be verified using the hash instance from the PMBCM. In one example, the receiver/decoder may compute hashes for the received control data blocks of the SMBCM 1400 via a first hash engine 1425 and/or a second hash engine 1427. The first hash engine 1425 may compute the hashes 408-422 for each control data block 1440-1454 while the second hash engine 1427 may compute a Hash Instance A from the computed hashes 408-422. In some implementations, the Hash Instance A may be compared 1431 to a received first hash information from the PMBCM (not shown) associated with the SMBCM 1400. If that comparison 1431 fails, then a subsequent operation may be performed by using error-correcting code words CW 1 to M 1402 to attempt to obtain the correct hashes.

Using the error-correcting code words CW 1 to M 1402 corresponding to the control data blocks 1440-1454 for the SMBCM 1400, a forward error correction (FEC) decoder 1406 can compute the hash array H 1408, 1410, 1412, 1414, 1416, 1418, 1420 and 1422. That is, the FEC decoder 1406 can recompute the hashes 1408-1422 for the SMBCM 1400 using the error correcting code words 1402. A third hash engine 1429 then computes a Hash Instance B based on the hashes of the hash array 1408-1422. The hash information instance 1426 can be computed from the hash array H 1408-1422.

In one instance, the Hash Instance B may be used as hash information instance 1426 which is compared 1431 to a received first hash information from the PMBCM (not shown) associated with the SMBCM 1400. This verifies that the error-correcting code words were received correctly. To verify the authenticity of each control data block 1440-1454 in the SMBCM 1400, each received hashes 408-422 may be compared to its corresponding recomputed hash 1408-1422. If a hash 408-422 does not match its corresponding recomputed hash 1408-1422, then the corresponding control data block 1440-1454 is ignored or rejected. On the other hand, if a hash 408-422 matches its corresponding recomputed hash 1408-1422, then the corresponding control data block 1440-1454 is accepted or utilized.

In yet other implementations, the Hash Instance A may be compared 1460 with the Hash Instance B to determine if the control data blocks have been compromised or corrupted. This comparison 1460 may take place either before or after comparing 1431 the hash instance 1426 with the received first hash instance from the PMBCM.

Figure 15:
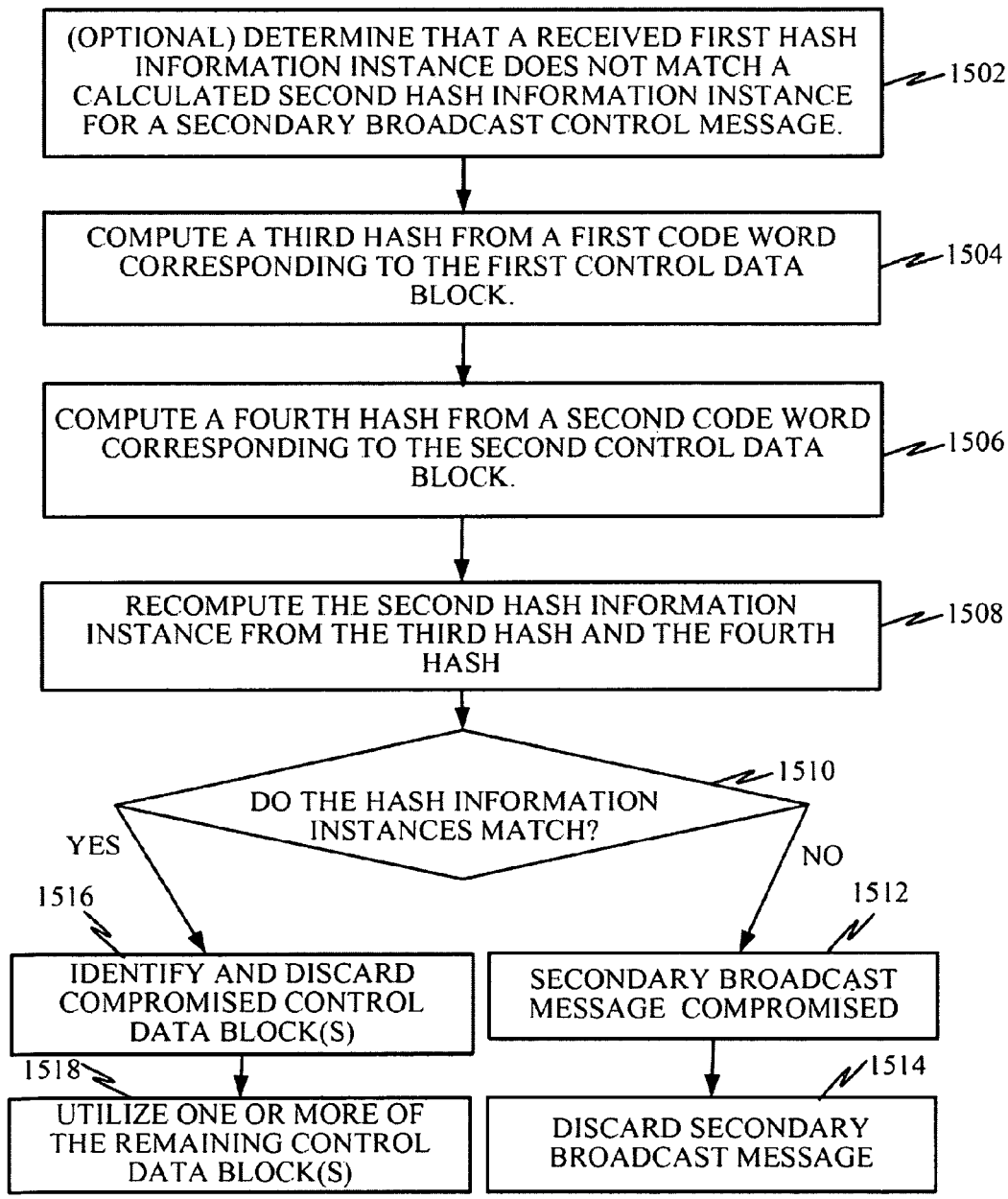
FIG. 15 is a flow diagram illustrating a method that may be carried out in conjunction with the method illustrated with respect to FIG. 12 and by the receiver system illustrated with respect to FIG. 14.

FIG. 15 is a flow diagram illustrating a method that may be carried out in conjunction with the method illustrated with respect to FIG. 12 and by the system illustrated with respect to FIG. 14. In some examples, this method may be optionally implemented after it has been determined that a received first hash information instance does not match a calculated second hash information instance (Hash Instance A in FIG. 14) for a secondary broadcast control message 1502. In other examples, this method may be implemented before and/or concurrent with any determination as to the accuracy of the received control data blocks or their hashes. A third hash, for example, H(1) 1408, H(2) 1410, H(3) 1412 or H(4) 1414, is computed from a first code word for example, code word CW(M-3), corresponding to the first control data block, for example, DB(M-3), of the secondary broadcast control message 1504. A fourth hash is computed from a second code word, for example, CW(M-2), corresponding to the second control data block, for example, DB(M-2), of the secondary broadcast control message 1506. The second hash information instance may then be recomputed from the third hash and the fourth hash 1508. A comparison is then made to determine whether the first hash information instance and recomputed second hash information instance match 1510. If there is no match, it can be concluded that the secondary broadcast message has been compromised 1512 and the secondary broadcast control message may be discarded 1514. Otherwise, if there is a match, the compromised control data block(s) may be identified and/or discarded. This identification of compromised control data blocks may be performed by comparing hashes computed from one or more error correcting code words for each control data block to hashes computed for said control data block. One or more of the remaining control data block(s), those data blocks that are not compromised, can be utilized 1518.

Second Alternative Example of Protecting Broadcast Control Message

FIG. 16 is a block diagram illustrating a receiver capable of verifying a received secondary broadcast control message by using error correcting code words. This block diagram may illustrate another alternative way of protecting and decoding a secondary broadcast control message. This example is a variation of the methodology illustrated in FIGS. 4 and 5. In the example illustrated in FIG. 16, a first hash engine 1623 uses the received control data blocks DB(M-3) 1602, DB(M-2) 1604, DB(M-1) 1606 and DB(M) 1608 to compute corresponding hash values H(M-3) 1616, H(M-2) 1618, H(M-1) 1620 and H(M) 1622. If one or more other control data blocks 1601, 1603, 1605, and/or 1607 are received with errors, error-correcting code words (e.g., code word 1624) for the control data blocks 1602, 1604, 1606, and/or 1608 can be used by FEC decoder 1627 to compute the one or more hash values 1608, 1610, 1612, and/or 1614 for the other control data blocks 1601, 1603, 16(05, and/or 1607. That is, in this example, the error-correcting code words (e.g., code word 1624) for the control data blocks 1602, 1604, 1606, and/or 1608 may include information to reconstruct the hashes for one or more other control data blocks 1601, 1603, 1605, and/or 1607 that may have been received with errors. In FIG. 16, only the error-correcting code word CW(M-3) 1624 for control data block 1602 is shown for illustration purposes. However, other code words CW(M-2), CW(M-1) and CW(M) are contemplated and may also be used by FEC decoder 1627 to compute the hash values 1608, 1610, 1612, and/or 1614 for the other control data blocks 16011, 1603, 1605, and/or 1607.

A second hash engine 1625 may then compute a hash information instance 1626 based on the hash values 1608, 1610, 1612, 1614, 1616, 1618, 1620 and 1622. A comparator 1629 may then compare hash information instance 1626 to the first hash information 528 from the PMBCM to authenticate the control data blocks of the SMBCM 160).

If the comparison 1629 fails, a process of elimination can be used to determine which control data block has been modified or has errors. Specifically, if the comparison fails, it can be assumed that at least one of the control data blocks DB(M-3) 1602, DB(M-2) 1604, DB(M-1) 1606 and DB(M) 1608 was received with one or more errors. One of these control data blocks may be selected randomly, or sequentially, or by any other method, and excluded from the calculation of the hash values 1608, 1610, 1612 and 1614. Thus, for example, the control data block DB(M-3) 1602 could be selected to not be used by FEC decoder 506 to compute hash values 1608, 1610, 1612 and 1614. The hash information instance 1626 is computed from the hash values computed without using DB(M-3) and just relying on DB(M-2), DB(M-1) and DB(M) as input to FEC decoder 1627. If a match is successful then it is determined that DB(M-3) 1602 was the control data block received in error. Control data block DB(M-3) 1602 can be discarded and the other control data blocks can be used. Note that, if discarded, the hash 1616 for DB(M-3) 1602 may be recomputed based on other error-correcting code words from other control data blocks. Alternatively, if the comparison is not successful, then another control data block DB(M-2) 1604 can be selected for exclusion in reconstructing hashes. Similar calculations to those above can be performed using only DB(M-3) 1602, DB(M-1) 1606 and DB(M) 1608. If a match is successful, then it is determined that DB(M-2) 1604 was received in error and the other control data blocks can be used. In this way, all data blocks can be checked and any one control data block received in error can be identified, so that it can be discarded while the other control data blocks can be used.

Similarly, if two control data blocks are received in error, two control data blocks would be selected and excluded from the computation of hashes 1608, 1610, 1612 and 1614. There are more combinations of two control data blocks than combinations of just one control data block, assuming there are more than three control data blocks. Accordingly, as long as there are more than three control data blocks, more computations would be needed to identify two control data blocks received in error than for just one received in error, but it is still possible. Even higher numbers of control data blocks than two can be identified by similar processes of elimination of all the combination until the control data blocks received in error are identified.

Figure 17A:
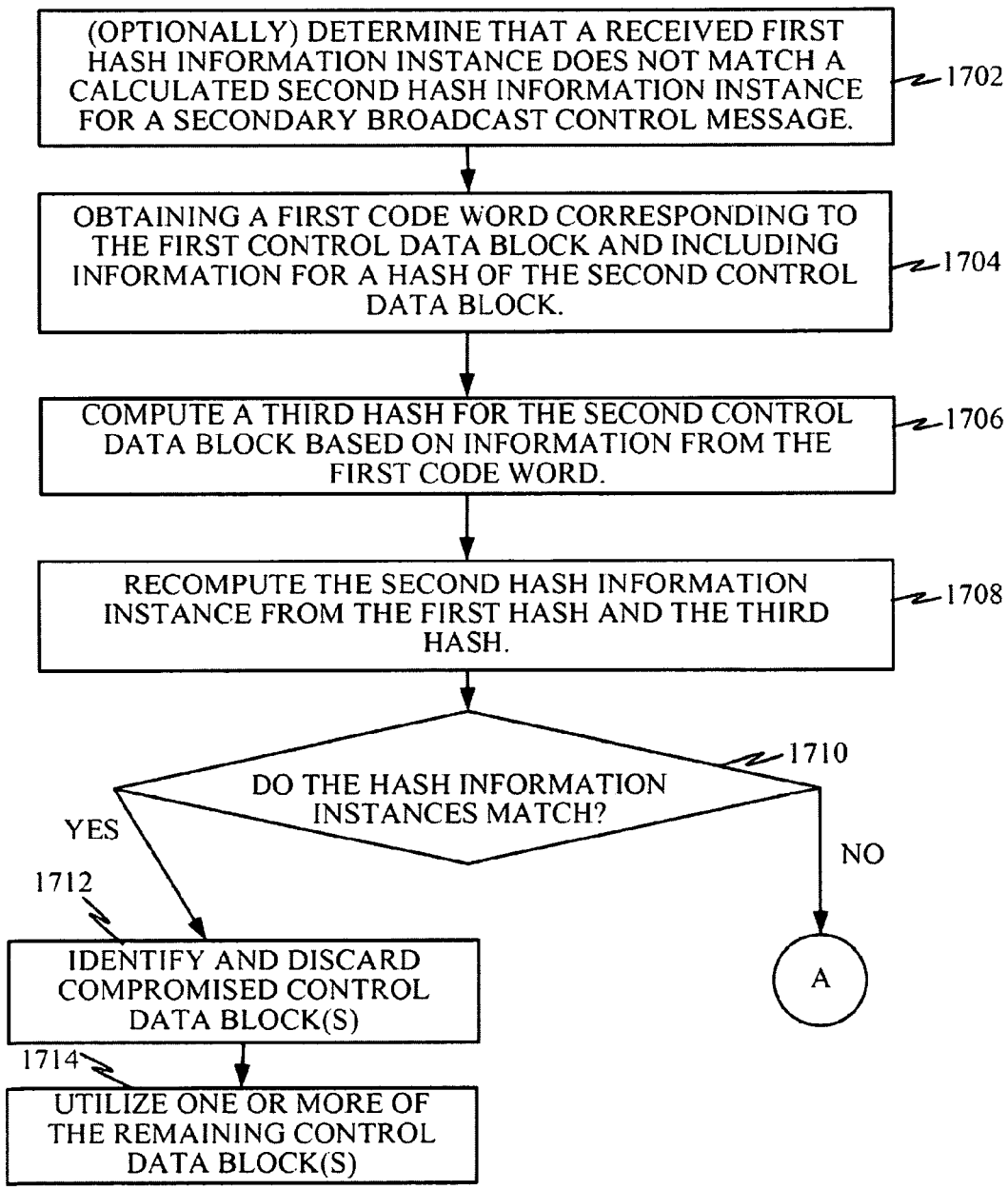
FIG. 17 (comprising FIGS. 17A and 17B) is a flow diagram illustrating a method that may be carried out in conjunction with the method illustrated with respect to FIG. 12 and by the receiver system illustrated with respect to FIG. 16.
Figure 17B:
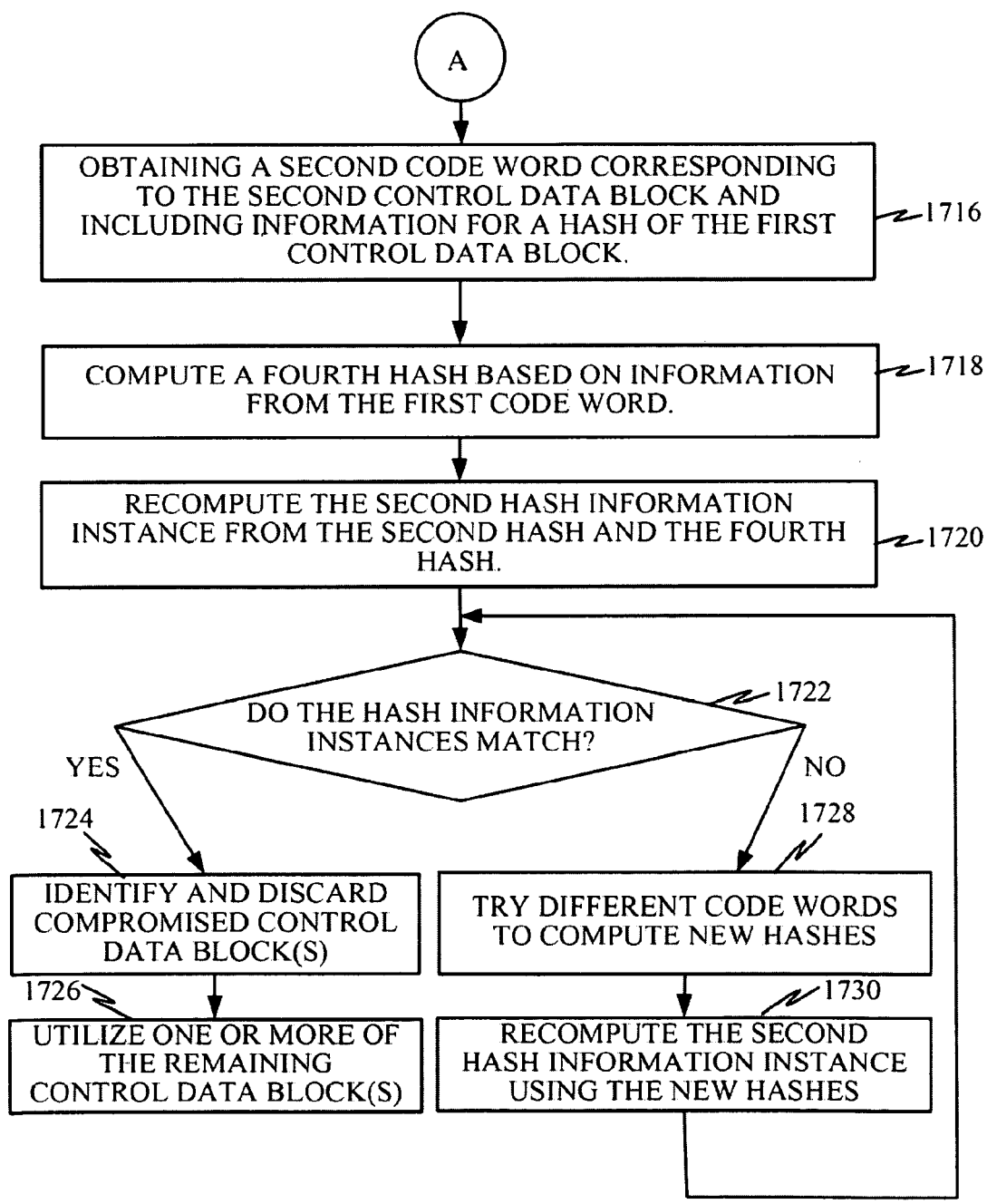

FIG. 17 (comprising FIGS. 17A and 17B) is a flow diagram illustrating a method that may be carried out in conjunction with the method illustrated with respect to FIG. 12. This method may be based on the alternative methodology illustrated in FIG. 16. In some examples, this method may be optionally implemented after it has been determined that a received first hash information instance does not match a calculated second hash information instance for a secondary broadcast control message 1702. In other examples, this method may be implemented before and/or concurrent with any determination as to the accuracy of the received control data blocks or their hashes.

A first (error-correcting) code word is obtained corresponding to the first control data block and including information for a hash of the second control data block 1704. A third hash is computed for the second control data block based on information from the first code word 1706. Note that the first code word includes information for one or more hashes of other control data blocks of the secondary broadcast control message. The second hash information instance may be computed or recomputed from the first hash and the third hash 1708.

A comparison may then be made to determine whether the first hash information instance and second hash information instance match 1710. If there is a match, the compromised control data block may be identified and/or discarded 1712. In this example, it may be assumed that the second control data block has been corrupted and may be discarded. This identification of compromised control data blocks may be performed by comparing hashes computed from one or more error correcting code words for each control data block to hashes computed for said control data block. One or more of the remaining control data block(s), those data blocks that are not compromised, can be utilized 1714.

If there is no match, the process is repeated with a different error-correcting code word. For example, a second code word may be obtained corresponding to the second control data block and including information for a hash of the first control data block 1716. A fourth hash may be computed based on information from the second code word 1718. The second hash information instance may be recomputed from the second hash and the fourth hash 1720.

A comparison may then be made to determine whether the first hash information instance and second hash information instance match 1722. If there is a match, the compromised control data block may be identified and/or discarded 1724. In this example, it may be assumed that the first control data block has been corrupted and may be discarded. This identification of compromised control data blocks may be performed by comparing hashes computed from one or more error correcting code words for each control data block to hashes computed for said control data block. One or more of the remaining control data block(s), those data blocks that are not compromised, can be utilized 1726. Otherwise, if there is no match, different code words are tried to compute new hashes 1728 and the second hash information instance is recomputed using the new hashes 1730. This process may be repeated multiple times to identify the compromised control data blocks and verify or authenticate the remaining control data blocks.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advanced RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order or the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data strictures stored thereon. The components may communicate by way of local and/or remote processes such as in accordance with a signal having one or more data packets (e.g., data from one component interacting with another component in a local system, distributed system, and/or across a network such as the Internet with other systems by way or the signal).

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in the FIGs. may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in the FIGs may be configured to perform one or more of the methods, features, or steps described in the FIGs. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static base stations (e.g., access points).

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for generating a secondary broadcast control message, the method comprising:
    generating a secondary broadcast control message that includes a plurality of control data blocks and error correcting code words;
    including information for the secondary broadcast control message in a primary broadcast control message;
    computing a first hash information instance for the secondary broadcast control message based on a plurality of hashes for the plurality of control data blocks of the secondary broadcast control message; and
    including the first hash information instance in the primary broadcast control message.

2. The method of claim 1, wherein computing the first hash information instance for the secondary broadcast control message based on a plurality of hashes for the plurality of control data blocks of the secondary broadcast control message comprises:
    computing a first hash from a first control data block of the secondary broadcast control message;
    computing a second hash from a second control data block of the secondary broadcast control message; and
    computing the first hash information instance from the first hash and the second hash.

3. The method of claim 2, further comprising:
    computing a first error correcting code word based on the first hash and one or more additional hashes for the control data blocks of the secondary broadcast control message;
    computing a second error correcting code word based on the second hash and one or more additional hashes for the control data blocks of the secondary broadcast control message; and
    including the first error correcting code word and the second error correcting code word in the secondary broadcast control message.

4. The method of claim 3, wherein the first error correcting code word is included as part of the first control data block and the second error correcting code word is included as part of the second the control data block.

5. The method of claim 3, wherein the first error correcting code word is also based at least partially on the second hash.

6. The method of claim 1, further comprising:
    transmitting the primary broadcast control message; and
    transmitting the secondary broadcast control message.

7. A communication device comprising:
    a secondary broadcast control message generator adapted to generate a secondary broadcast control message that includes a plurality of control data blocks and error correcting code words;
    a primary broadcast control message generator adapted include information for the secondary broadcast control message in a primary broadcast control message; and
    a hash engine adapted to compute a first hash information instance for the secondary broadcast control message based on a plurality of hashes for the plurality of control data blocks of the secondary broadcast control message;
    wherein the primary broadcast control message generator is further adapted to include the first hash information instance in the primary broadcast control message.

8. The communication device of claim 7, wherein the hash engine is further adapted to
    compute a first hash from a first control data block of the secondary broadcast control message;
    compute a second hash from a second control data block of the secondary broadcast control message; and
    compute the first hash information instance from the first hash and the second hash.

9. The communication device of claim 8, further comprising:
    a forward error code encoder adapted to
    compute a first error correcting code word based on the first hash and one or more additional hashes for the control data blocks of the secondary broadcast control message; and
    compute a second error correcting code word based on the second hash and one or more additional hashes for the control data blocks of the secondary broadcast control message;
    wherein the secondary broadcast control message generator is further adapted to include the first error correcting code word and the second error correcting code word in the secondary broadcast control message.

10. The communication device of claim 9, wherein the first error correcting code word is included as part of the first control data block and the second error correcting code word is included as part of the second the control data block.

11. The communication device of claim 7, further comprising:
    a transmitting module adapted to
    transmit the primary broadcast control message; and
    transmit the secondary broadcast control message.

12. A communication device comprising:
    means for generating a secondary broadcast control message that includes a plurality of control data blocks and error correcting code words;
    means for including information for the secondary broadcast control message in a primary broadcast control message;
    means for computing a first hash information instance for the secondary broadcast control message based on a plurality of hashes for the plurality of control data blocks of the secondary broadcast control message; and
    means for including the first hash information instance in the primary broadcast control message.

13. The communication device of claim 12, wherein the means for computing the first hash information instance for the secondary broadcast control message based on a plurality of hashes for the plurality of control data blocks of the secondary broadcast control message comprises:
    means for computing a first hash from a first control data block of the secondary broadcast control message;

means for computing a second hash from a second control data block of the secondary broadcast control message; and means for computing the first hash information instance from the first hash and the second hash.

14. The communication device of claim 13, further comprising:

means for computing a first error correcting code word based on the first hash and one or more additional hashes for the control data blocks of the secondary broadcast control message;

means for computing a second error correcting code word based on the second hash and one or more additional hashes for the control data blocks of the secondary broadcast control message; and means for including the first error correcting code word and the second error correcting code word in the secondary broadcast control message.

15. The communication device of claim 12, further comprising:

means for transmitting the primary broadcast control message; and means for transmitting the secondary broadcast control message.

16. A non-transitory computer-readable storage medium comprising instructions for generating a secondary broadcast control message, which when executed by a processor causes the processor to: generate a secondary broadcast control message that includes a plurality of control data blocks and error correcting code words; include information for the secondary broadcast control message in a primary broadcast control message; compute a first hash information instance for the secondary broadcast control message based on a plurality of hashes for the plurality of control data blocks of the secondary broadcast control message; and include the first hash information instance in the primary broadcast control message.

17. The computer-readable storage medium of claim 16, wherein computing the first hash information instance for the secondary broadcast control message based on a plurality of hashes for the plurality of control data blocks of the secondary broadcast control message further includes instructions for causing the processor to:

compute a first hash from a first control data block of the secondary broadcast control message;

compute a second hash from a second control data block of the secondary broadcast control message; and compute the first hash information instance from the first hash and the second hash.

18. The computer-readable storage medium of claim 17, the instructions further comprising the processor to:

compute a first error correcting code word based on the first hash and one or more additional hashes for the control data blocks of the secondary broadcast control message;

compute a second error correcting code word based on the second hash and one or more additional hashes for the control data blocks of the secondary broadcast control message; and include the first error correcting code word and the second error correcting code word in the secondary broadcast control message.

19. A processor comprising a processing circuit adapted to:

generate a secondary broadcast control message that includes a plurality of control data blocks and error correcting code words;

include information for the secondary broadcast control message in a primary broadcast control message;

compute a first hash information instance for the secondary broadcast control message based on a plurality of hashes for the plurality of control data blocks of the secondary broadcast control message; and include the first hash information instance in the primary broadcast control message.

20. A method for processing a secondary broadcast control message, comprising:

obtaining a primary broadcast control message;

obtaining a secondary broadcast control message associated with the primary broadcast control message;

identifying a first hash information instance for the secondary broadcast control message in the primary broadcast control message;

computing a second hash information instance based on a plurality of control data blocks of the secondary broadcast control message, where the secondary broadcast control message includes error correcting code words that facilitate computing a correct version of the second hash information even if one or more of the control data blocks have been compromised; and comparing the first hash information instance to the second hash information instance to determine whether the secondary broadcast control message has been compromised.

21. The method of claim 20, further comprising:

determining that a first control data block has been compromised;

reconstructing a first hash of the first control data block from the error correcting code words; and computing the second hash information based on the first hash and one or more additional hashes for the plurality of control data blocks.

22. The method of claim 20, wherein each control data block has an appended error correcting code word based on one or more computed hashes for the plurality of control data blocks.

23. The method of claim 20, further comprising:

verifying a digital signature of the primary broadcast control message, wherein the digital signature covers the primary broadcast control message and the first hash information instance.

24. The method of claim 20, further comprising:

determining that a first control data block of the secondary broadcast control message was compromised based on an error correcting code calculation;

identifying a code word corresponding to a second control data block of the secondary broadcast control message;

computing a first hash for the first control data block of the secondary broadcast control message based at least in part on an error correcting code word corresponding to the second control data block of the secondary broadcast control message;

computing a second hash from the second control data block of the secondary broadcast control message; and computing the second hash information instance from the first hash and the second hash.

25. The method of claim 20, wherein computing the second hash information instance comprises:

computing a first hash from a first control data block of the secondary broadcast control message;

computing a second hash from a second control data block of the secondary broadcast control message; and computing the second hash information instance from the first hash and the second hash.

26. The method of claim 25, wherein if the comparison of the first hash information instance to the second hash information instance indicates that the secondary broadcast control message has been compromised, further comprising:
computing a third hash from a first code word corresponding to the first control data block;
computing a fourth hash from a second code word corresponding to the second control data block;
recomputing the second hash information instance from the third hash and the fourth hash; and
comparing the first hash information instance to the recomputed second hash information instance to determine whether the secondary broadcast control message has been compromised.

27. The method of claim 26, further comprising:
comparing the recomputed second hash information instance to the first hash information instance to determine if they match;
if a match is determined,
identifying and discarding one or more compromised control data blocks of the secondary broadcast control message, and
utilizing one or more of the remaining control data blocks; and
if no match is determined, discarding the secondary broadcast control message.

28. The method of claim 25, wherein if the comparison of the first hash information instance to the second hash information instance indicates that the secondary broadcast control message has been compromised, further comprising:
obtaining a first code word corresponding to the first control data block and including information for a hash of the second control data block;
computing a third hash for the second control data block based on information from the first code word; and
recomputing the second hash information instance from the first hash and the third hash.

29. The method of claim 28, further comprising:
comparing the recomputed second hash information instance to the first hash information instance to determine if they match;
if a match is determined,
identifying and discarding the second control data block, and
utilizing one or more of the remaining control data blocks; and
if no match is determined,
obtaining a second code word corresponding to the second control data block and including information for a hash of the first control data block;
computing a fourth hash based on information from the second code word; and
recomputing the second hash information instance from the second hash and the fourth hash.

30. A mobile device comprising:
a receiver for obtaining a primary broadcast control message and a secondary broadcast control message associated with the primary broadcast control message;
a primary broadcast control message verifier adapted to identify a first hash information instance for the secondary broadcast control message in the primary broadcast control message;
a hash engine adapted to compute a second hash information instance using error correcting code words obtained from the secondary broadcast control message if it is determined that at least one control data block of the obtained secondary broadcast control message has been compromised; and
a secondary broadcast control message verifier adapted to compare the first hash information instance to the second hash information instance to determine whether the secondary broadcast control message has been compromised.

31. The mobile device of claim 30, wherein the hash engine is further configured to:
compute a first hash from a first control data block of the secondary broadcast control message;
compute a second hash from a second control data block of the secondary broadcast control message; and
compute the second hash information instance from the first hash and the second hash.

32. The mobile device of claim 30, wherein the primary broadcast control message verifier determines that a first control data block of the secondary broadcast control message was compromised based on an error correcting code calculation, and further comprising:
a forward error correcting decoder adapted to identify an error correcting code word corresponding to a second control data block of the secondary broadcast control message;
wherein the hash engine is adapted to
compute a first hash for the first control data block of the secondary broadcast control message based at least in part on the error correcting code word corresponding to the second control data block of the secondary broadcast control message;
compute a second hash from the second control data block of the secondary broadcast control message; and
compute the second hash information instance from the first hash and the second hash.

33. A mobile device, comprising:
means for obtaining a primary broadcast control message;
means for obtaining a secondary broadcast control message associated with the primary broadcast control message;
means for identifying a first hash information instance for the secondary broadcast control message in the primary broadcast control message;
means for computing a second hash information instance using error correcting code words obtained from the secondary broadcast control message if it is determined that at least one control data block of the obtained secondary broadcast control message has been compromised; and
means for comparing the first hash information instance to the second hash information instance to determine whether the secondary broadcast control message has been compromised.

34. The mobile device of claim 33, further comprising:
means for determining that a first control data block has been compromised;
means for reconstructing a first hash of the first control data block from the error correcting code words; and
means for computing the second hash information based on the first hash and one or more additional hashes for the plurality of control data blocks.

35. The mobile device of claim 33, further comprising:
means for determining that a first control data block of the secondary broadcast control message was compromised based on an error correcting code calculation;
means for identifying an error correcting code word corresponding to a second control data block of the secondary broadcast control message;
means for computing a first hash for the first control data block of the secondary broadcast control message based at least in part on an error correcting code word corresponding to the second control data block of the secondary broadcast control message;
means for computing a second hash from the second control data block of the secondary broadcast control message; and
means for computing the second hash information instance from the first hash and the second hash.

36. The mobile device of claim 33, wherein computing the second hash information instance comprises:
means for computing a first hash from a first control data block of the secondary broadcast control message;
means for computing a second hash from a second control data block of the secondary broadcast control message; and
means for computing the second hash information instance from the first hash and the second hash.

37. The mobile device of claim 36, further comprising:
means for computing a third hash from a first error correcting code word corresponding to the first control data block of the secondary broadcast control message and a second error correcting code word corresponding to the second control data blocks of the secondary broadcast control message, wherein the first control data block and the second control data block are control data blocks and a third control data block corresponding to the third hash is a control data carrying block; and
wherein the computing the second hash information instance from the first hash and the second hash further comprises computing the second hash information instance from the third hash.

38. The mobile device of claim 37, further comprising:
means for computing a third hash from a first error correcting code word corresponding to the first control data block if the secondary broadcast control message has been compromised;
means for computing a fourth hash from a second error correcting code word corresponding to the second control data block if the secondary broadcast control message has been compromised;
means for recomputing the second hash information instance from the third hash and the fourth hash; and
means for comparing the first hash information instance to the recomputed second hash information instance to determine whether the secondary broadcast control message has been compromised.

39. The mobile device of claim 36, further comprising:
means for obtaining a first error correcting code word corresponding to the first control data block and including information for a hash of the second control data block;
means for computing a third hash for the second control data block based on information from the first error correcting code word if the comparison of the first hash information instance to the second hash information instance indicates that the secondary broadcast control message has been compromised; and
means for recomputing the second hash information instance from the first hash and the third hash.

40. A non-transitory computer-readable storage medium comprising instructions for receiving a secondary broadcast control message, which when executed by a processor causes the processor to: obtain a primary broadcast control message; obtain a secondary broadcast control message associated with the primary broadcast control message; identify a first hash information instance for the secondary broadcast control message in the primary broadcast control message; compute a second hash information instance based on a plurality of control data blocks of the secondary broadcast control message, where the secondary broadcast control message includes error correcting code words that facilitate computing a correct version of the second hash information even if one or more of the control data blocks have been compromised; and compare the first hash information instance to the second hash information instance to determine whether the secondary broadcast control message has been compromised.

41. The computer-readable storage medium of claim 40, further comprising instructions that cause the processor to:
determine that a first control data block has been compromised;
reconstruct a first hash of the first control data block from the error correcting code words; and
compute the second hash information based on the first hash and one or more additional hashes for the plurality of control data blocks.

42. The computer-readable storage medium of claim 40, the instructions further causing the processor to:
determine that a first control data block of the secondary broadcast control message was compromised based on an error correcting code calculation;
identify an error correcting code word corresponding to a second control data block of the secondary broadcast control message;
compute a first hash for the first control data block of the secondary broadcast control message based at least in part on an error correcting code word corresponding to the second control data block of the secondary broadcast control message;
compute a second hash from the second control data block of the secondary broadcast control message; and
compute the second hash information instance from the first hash and the second hash.

43. A processor comprising a processing circuit adapted to:
obtain a primary broadcast control message;
obtain a secondary broadcast control message associated with the primary broadcast control message;
identify a first hash information instance for the secondary broadcast control message in the primary broadcast control message;
compute a second hash information instance based on a plurality of control data blocks of the secondary broadcast control message, where the secondary broadcast control message includes error correcting code words that facilitate computing a correct version of the second hash information even if one or more of the control data blocks have been compromised; and
compare the first hash information instance to the second hash information instance to determine whether the secondary broadcast control message has been compromised.

* * * * *